(12) United States Patent
Ramey et al.

(10) Patent No.: US 9,033,748 B2
(45) Date of Patent: May 19, 2015

(54) FLEXIBLE BUSBAR CONNECTORS

(71) Applicant: Panduit Corp., Tinley Park, IL (US)

(72) Inventors: Samuel C. Ramey, Naperville, IL (US); Shaun P. Brouwer, St. John, IN (US)

(73) Assignee: Panduit Corp., Tinley Park, IL (US)

( * ) Notice: Subject to any disclaimer, the term of this patent is extended or adjusted under 35 U.S.C. 154(b) by 25 days.

(21) Appl. No.: 13/975,820

(22) Filed: Aug. 26, 2013

(65) Prior Publication Data

US 2014/0073204 A1   Mar. 13, 2014

Related U.S. Application Data

(60) Provisional application No. 61/700,116, filed on Sep. 12, 2012.

(51) Int. Cl.
| H01R 13/621 | (2006.01) |
| H01R 4/64 | (2006.01) |
| F16B 5/02 | (2006.01) |

(52) U.S. Cl.
CPC ............ *H01R 13/621* (2013.01); *F16B 5/0266* (2013.01); *H01R 4/64* (2013.01)

(58) Field of Classification Search
CPC ........ F16B 5/0266; H01R 13/621; H01R 4/64
USPC ......... 439/813, 510, 415–416, 411, 427–428, 439/709, 651, 492, 212, 213, 711, 717, 439/796–798, 805, 810, 814
See application file for complete search history.

(56) References Cited

U.S. PATENT DOCUMENTS

| 3,685,714 | A | | 8/1972 | Moyer et al. |
| 3,852,701 | A | * | 12/1974 | Minitz ........................ 439/248 |
| 3,978,761 | A | | 9/1976 | Sosinski |
| 4,046,054 | A | | 9/1977 | Gulistan |
| 4,119,816 | A | | 10/1978 | Davis |
| 4,205,572 | A | | 6/1980 | Weiner |
| 4,615,578 | A | | 10/1986 | Stadler et al. |
| 4,922,068 | A | | 5/1990 | Bangs |
| 4,973,370 | A | | 11/1990 | Kreinberg |
| 5,249,978 | A | | 10/1993 | Gazda et al. |
| 5,672,070 | A | * | 9/1997 | Weiss ............................ 439/213 |
| 5,989,073 | A | | 11/1999 | Kahoun |
| 7,766,703 | B2 | * | 8/2010 | Carver ......................... 439/801 |
| 8,002,573 | B2 | | 8/2011 | Elsaesser et al. |
| 8,254,078 | B2 | | 8/2012 | Sutton et al. |
| 2003/0040215 | A1 | | 2/2003 | Kleen |
| 2009/0274956 | A1 | | 11/2009 | Kosugi et al. |

* cited by examiner

*Primary Examiner* — Edwin A. Leon
(74) *Attorney, Agent, or Firm* — Christopher S. Clancy; James H. Williams

(57) ABSTRACT

A flexible electrical connector for electrical equipment is provided. The flexible electrical connector includes a flexible electrical conductor, a terminated end electrically and mechanically connected to the flexible electrical conductor, and a captive fastener for electrically and mechanically connecting the electrical equipment to the terminated end. The captive fastener is operably connected to the terminated end and includes a shaft operably connected to the terminated end, a rotatable member operably connected to the shaft, and a resilient member operably connected to the shaft and disposed between the rotatable member and the terminated end.

24 Claims, 32 Drawing Sheets

FLEXIBLE BUSBAR CONNECTORS

CROSS REFERENCE TO RELATED APPLICATIONS

This application claims the benefit of U.S. Provisional Patent Application No. 61/700,116, filed on Sep. 12, 2012, which is incorporated by reference in its entirety.

BACKGROUND OF THE INVENTION

The present invention relates to flexible busbar connectors, and more particularly, flexible busbar connectors having captive fasteners.

Flexible busbar connectors are well known in the art. For example, U.S. Patent Application Publication No. 2003/0040215 discloses flexible busbar connector 100. However, flexible busbar connector 100 is installed using bolts 140, which is difficult because bolts 140 are separate from flexible busbar connector 100 and connection point 22.

Therefore, there is a need for flexible busbar connectors having captive fasteners.

SUMMARY OF THE INVENTION

A flexible electrical connector for electrical equipment is provided. The flexible electrical connector includes a flexible electrical conductor, a terminated end electrically and mechanically connected to the flexible electrical conductor, and a captive fastener for electrically and mechanically connecting the electrical equipment to the terminated end. The captive fastener is operably connected to the terminated end and includes a shaft operably connected to the terminated end, a rotatable member operably connected to the shaft, and a resilient member operably connected to the shaft and disposed between the rotatable member and the terminated end.

DETAILED DESCRIPTION

Figure 1:
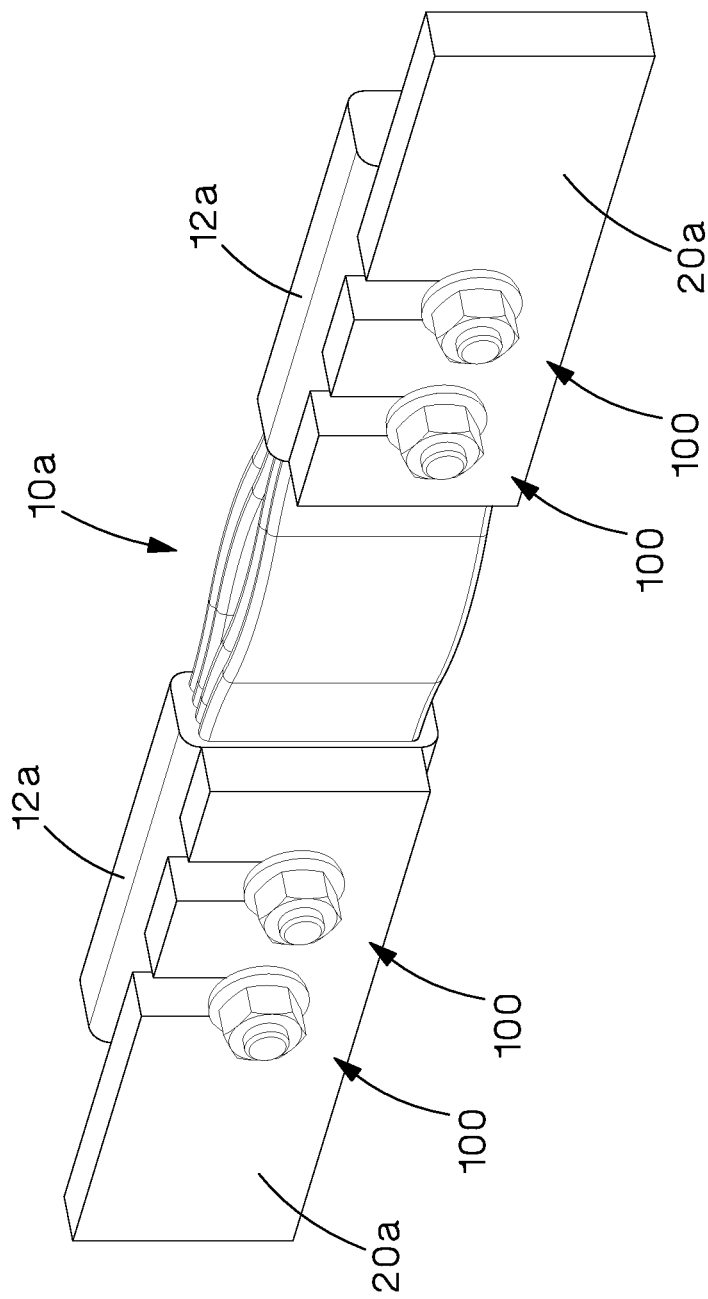
FIGS. 1-4 illustrate a flexible busbar connector according to a first embodiment of the present invention.
Figure 2:
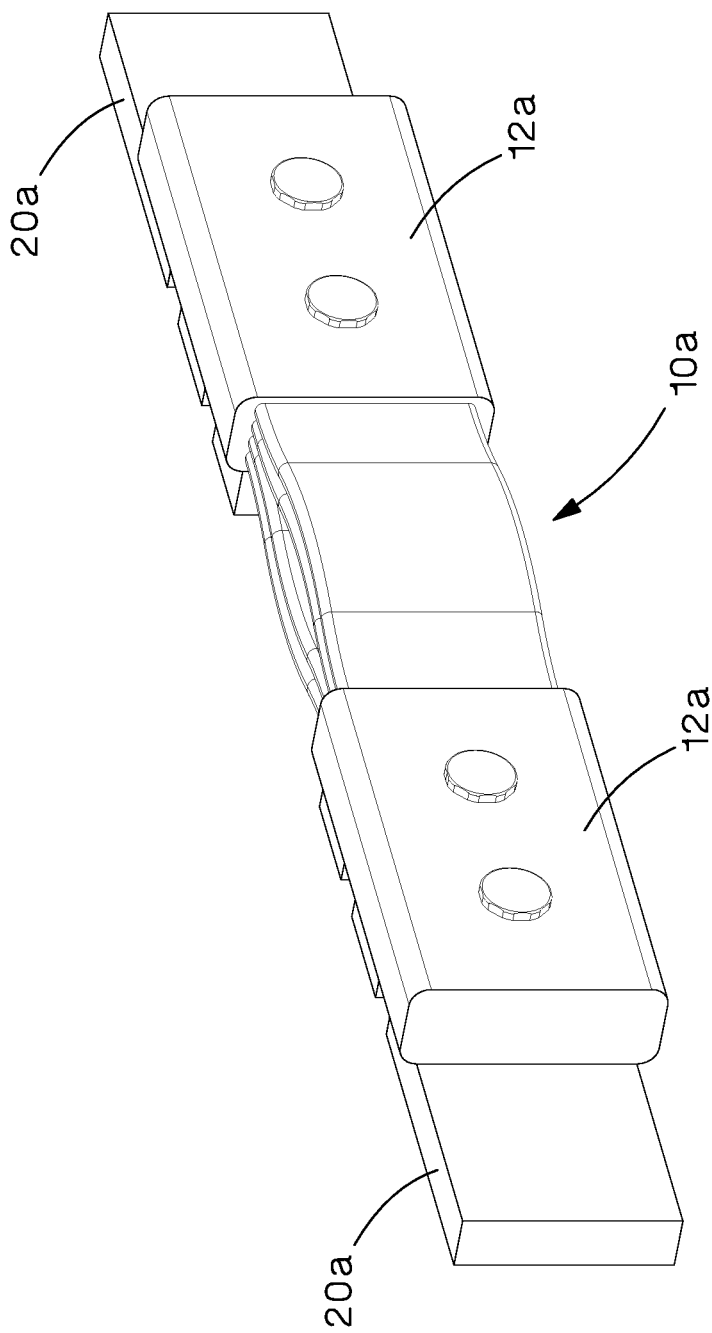
Figure 3:
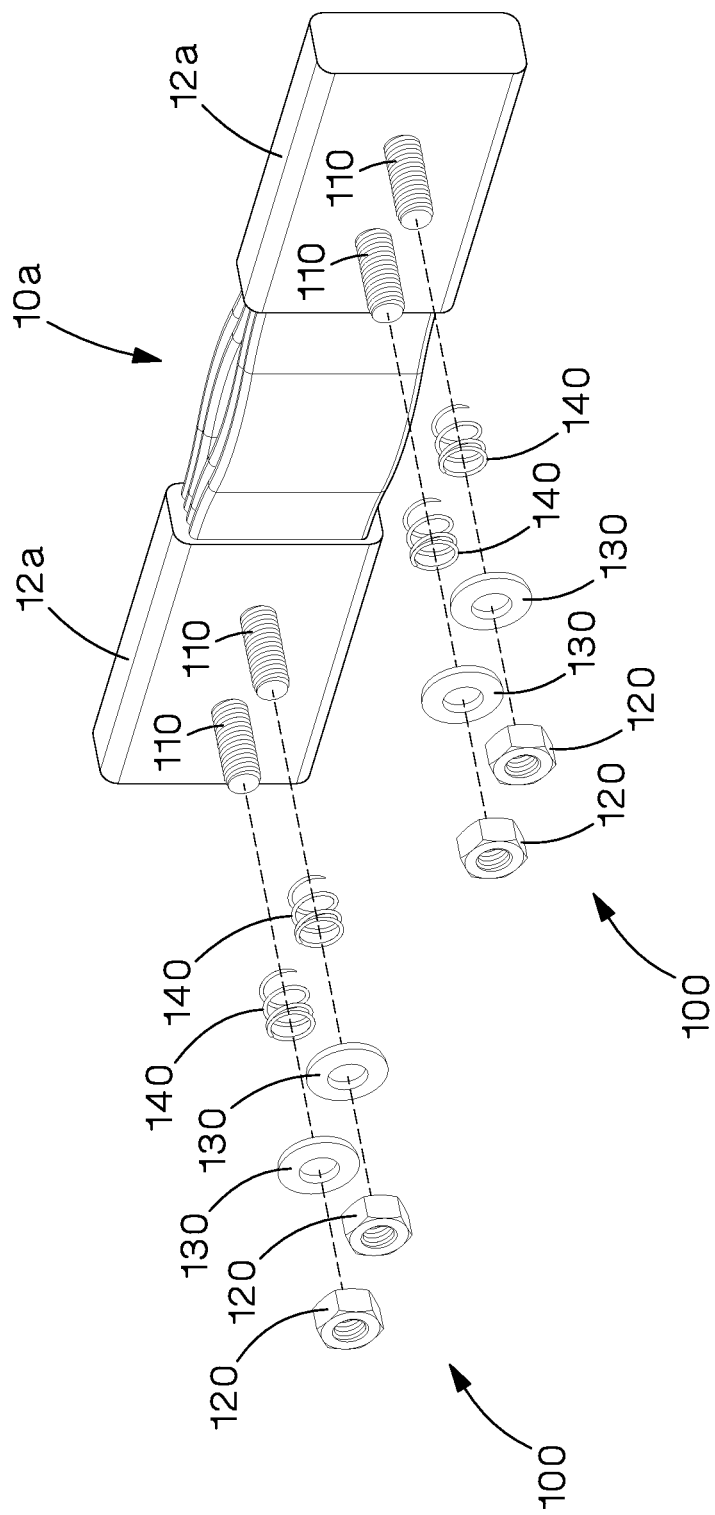
Figure 4:
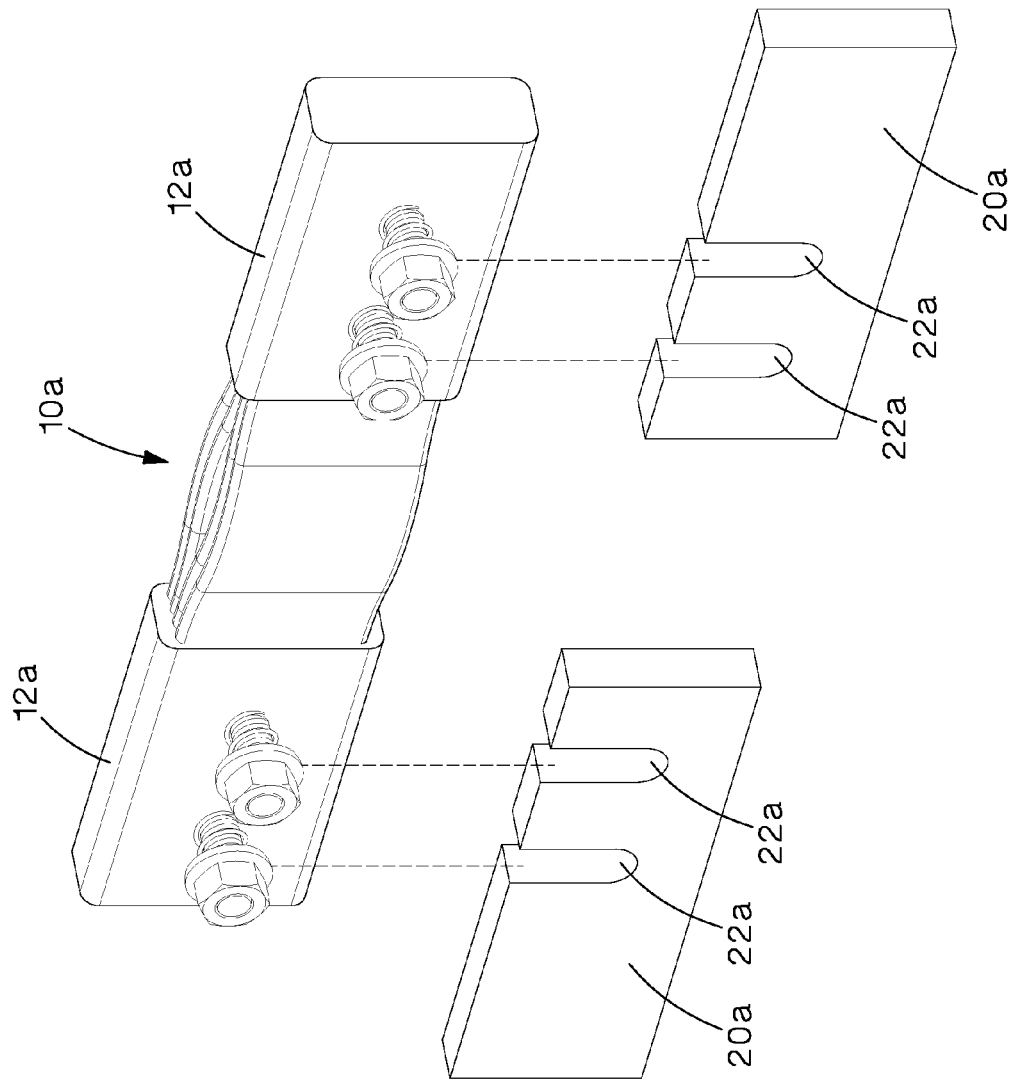

As shown in FIGS. 1-4, captive fastener 100 includes press-fit threaded stud 110, nut 120, Belleville washer 130, and compression spring 140. Terminated ends 12a of flexible busbar connector 10a include holes (not shown) for receiving captive fastener 100, and more particularly, press-fit threaded stud 110. Busbars 20a include open-ended slots 22a for receiving flexible busbar connector 10a, and more particularly, captive fastener 100. When captive fastener 100, and more particularly, nut 120 is loose, compression spring 140 provides clearance for sliding flexible busbar connector 10a onto busbar 20a. However, when captive fastener 100, and more particularly, nut 120 is tight, flexible busbar connector 10a is secured to busbar 20a.

Figure 5:
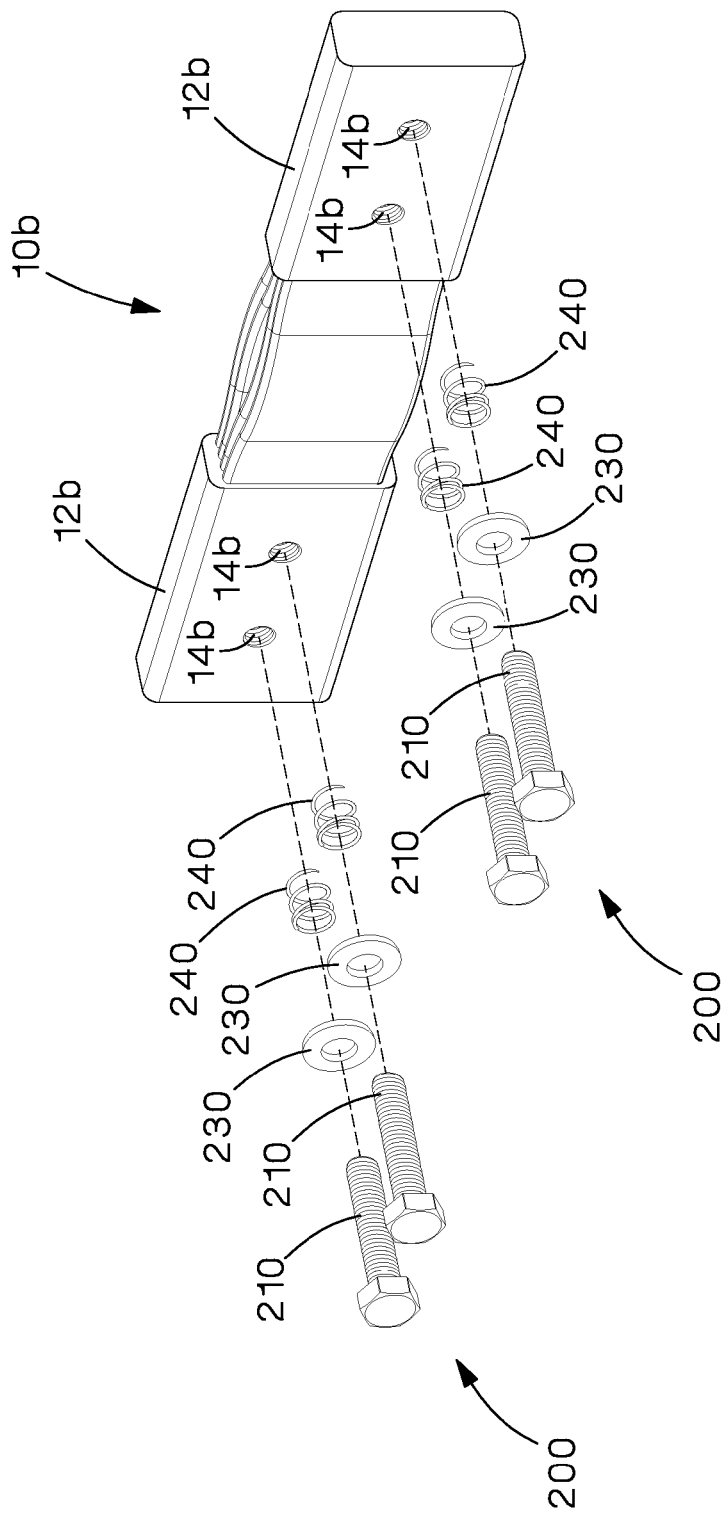
FIG. 5 illustrates a flexible busbar connector according to a second embodiment of the present invention.

As shown in FIG. 5, captive fastener 200 includes screw 210, Belleville washer 230, and compression spring 240. Terminated ends 12b of flexible busbar connector 10b include tapped holes 14b for receiving captive fastener 200, and more particularly, screw 210. Preferably, screw 210 includes threads. Busbars 20a include open ended-slots 22a for receiving flexible busbar connector 10b, and more particularly, captive fastener 200. When captive fastener 200, and more particularly, screw 210 is loose, compression spring 240 provides clearance for sliding flexible busbar connector 10b onto busbar 20a. However, when captive fastener 200, and more particularly, screw 210 is tight, flexible busbar connector 10b is secured to busbar 20a.

Figure 6:
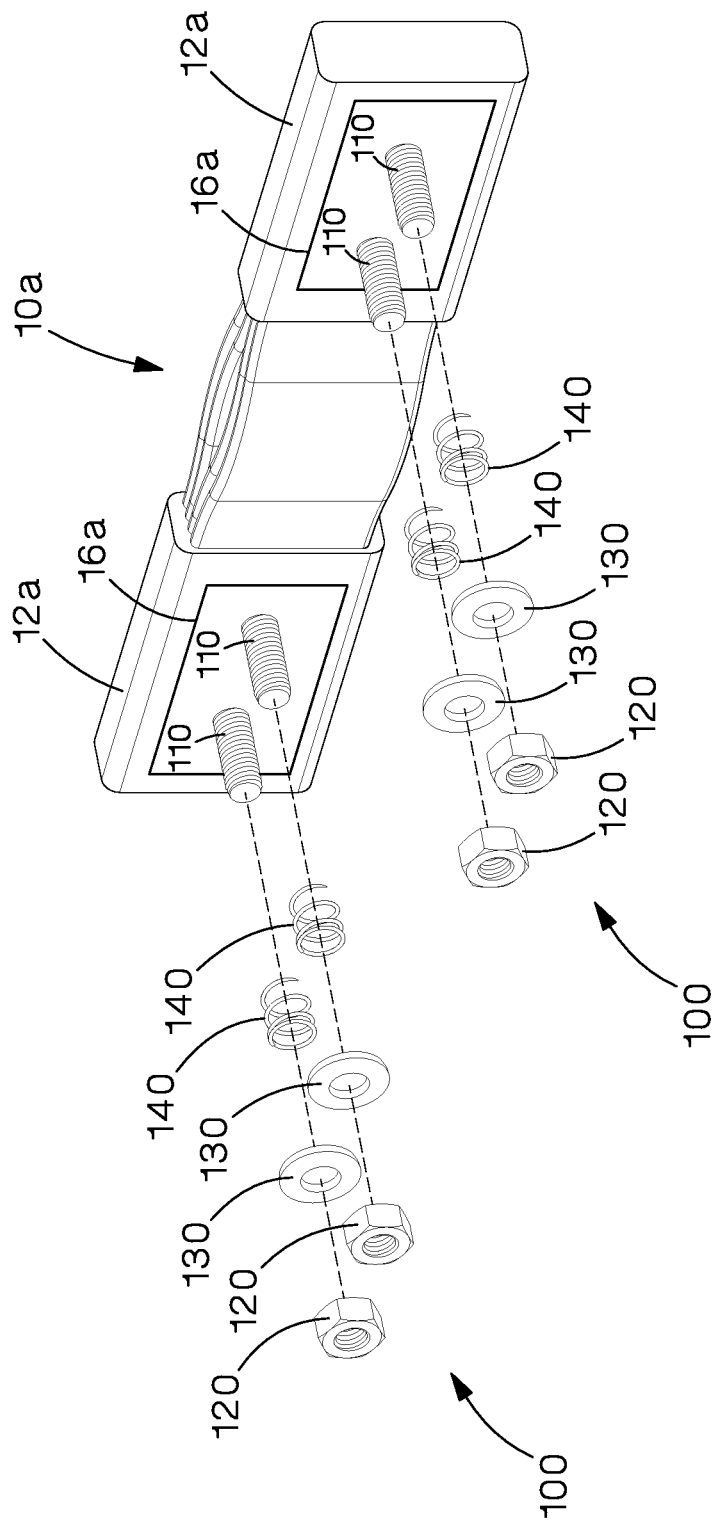
FIGS. 6 and 7 illustrate a flexible busbar connector according to a third embodiment of the present invention.
Figure 7:
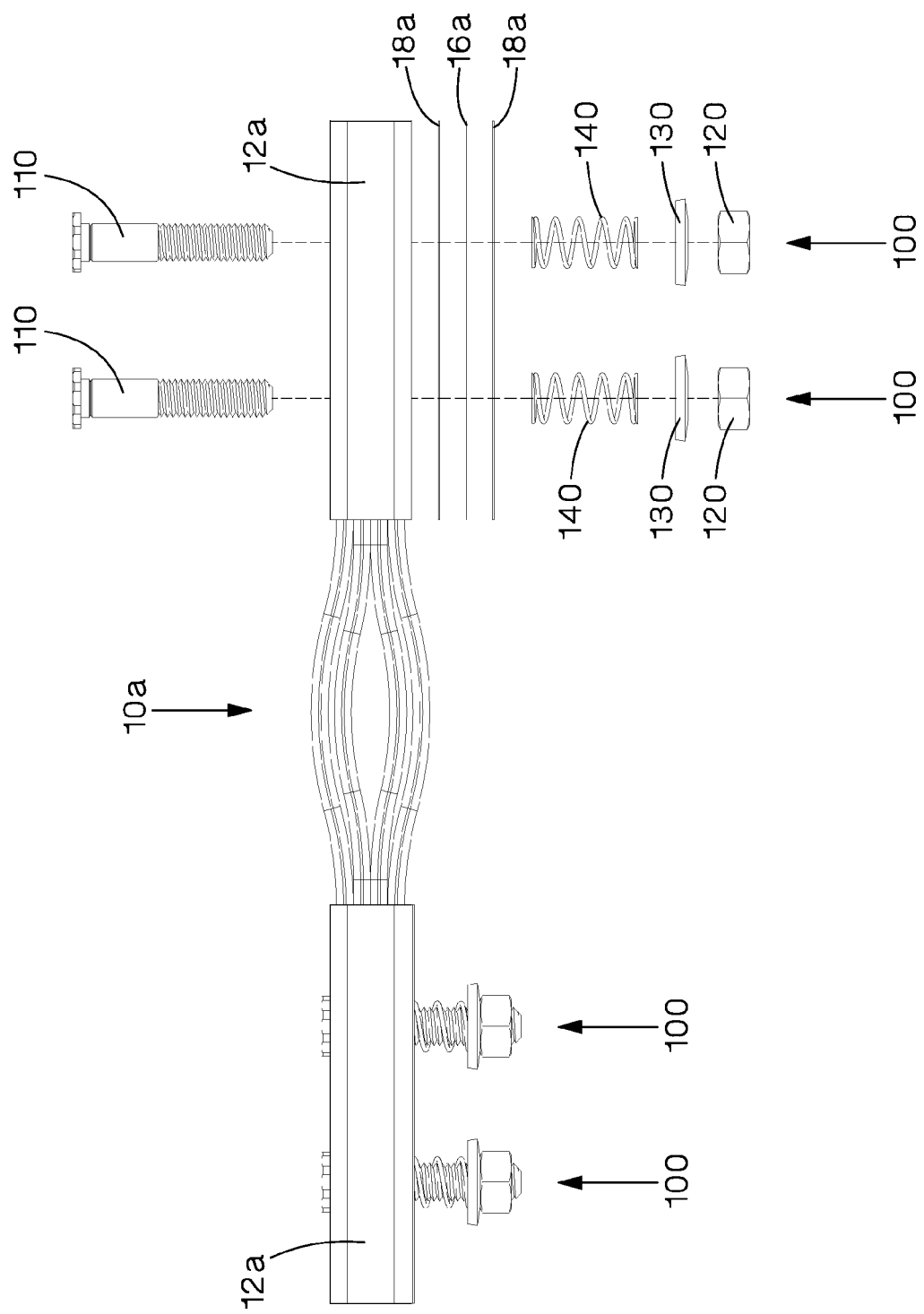

As shown in FIGS. 6 and 7, terminated ends 12a of flexible busbar connector 10a include reactive boding layer 16a, such as NanoFoil®.

Figure 8:
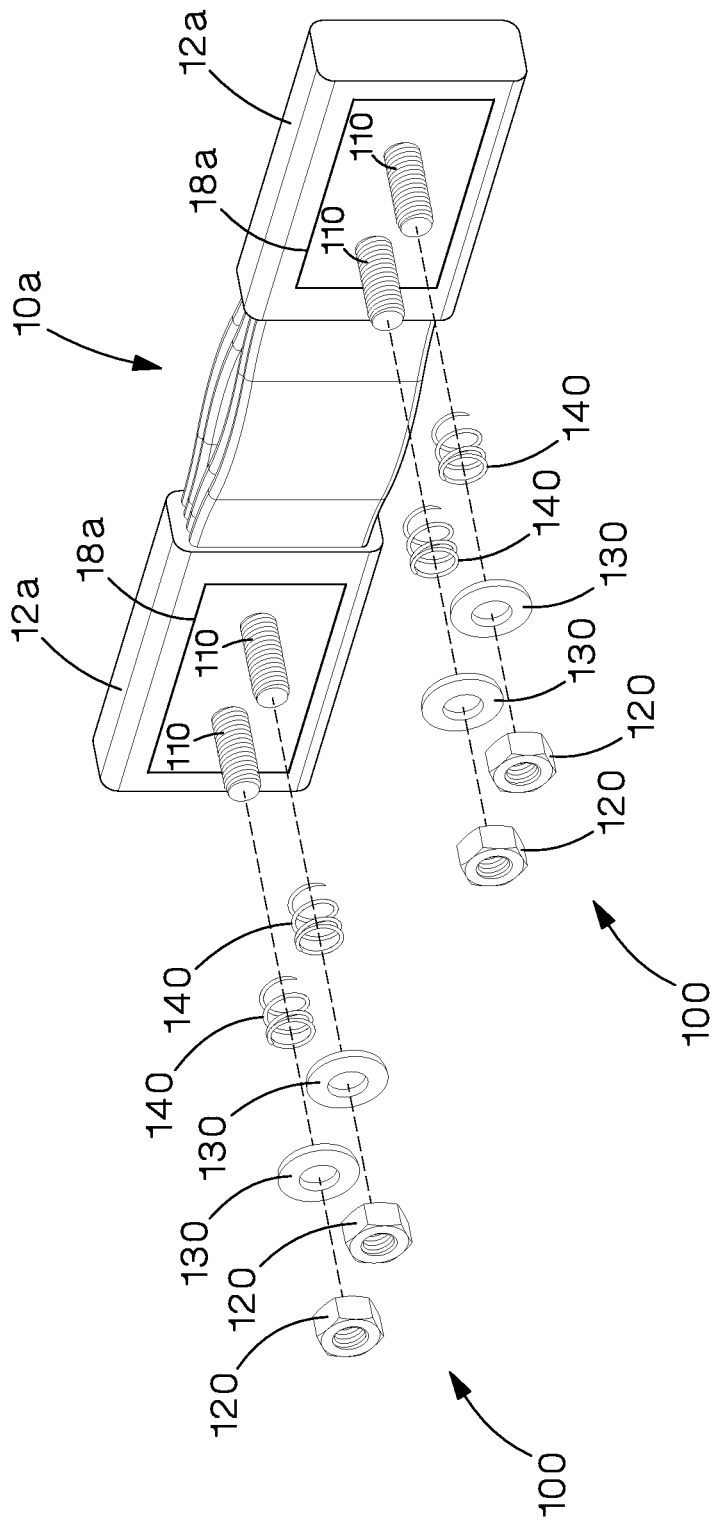
FIGS. 8 and 9 illustrate a flexible busbar connector according to a fourth embodiment of the present invention.
Figure 9:
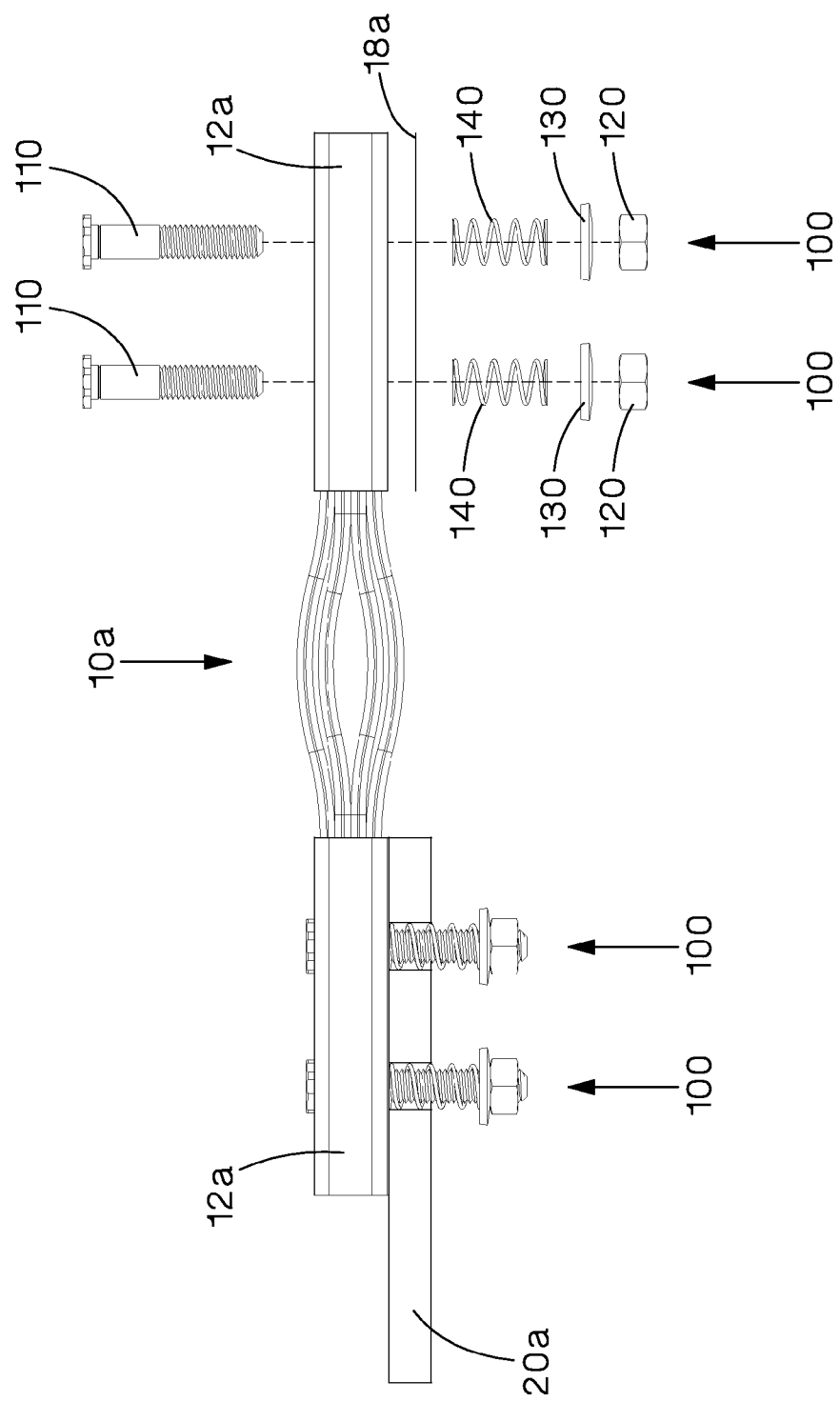

Additionally, as shown in FIGS. 6 and 7, or alternatively, as shown in FIGS. 8 and 9, terminated ends 12a of flexible busbar connector 10a include brazing/soldering perform 18a.

Figure 10:
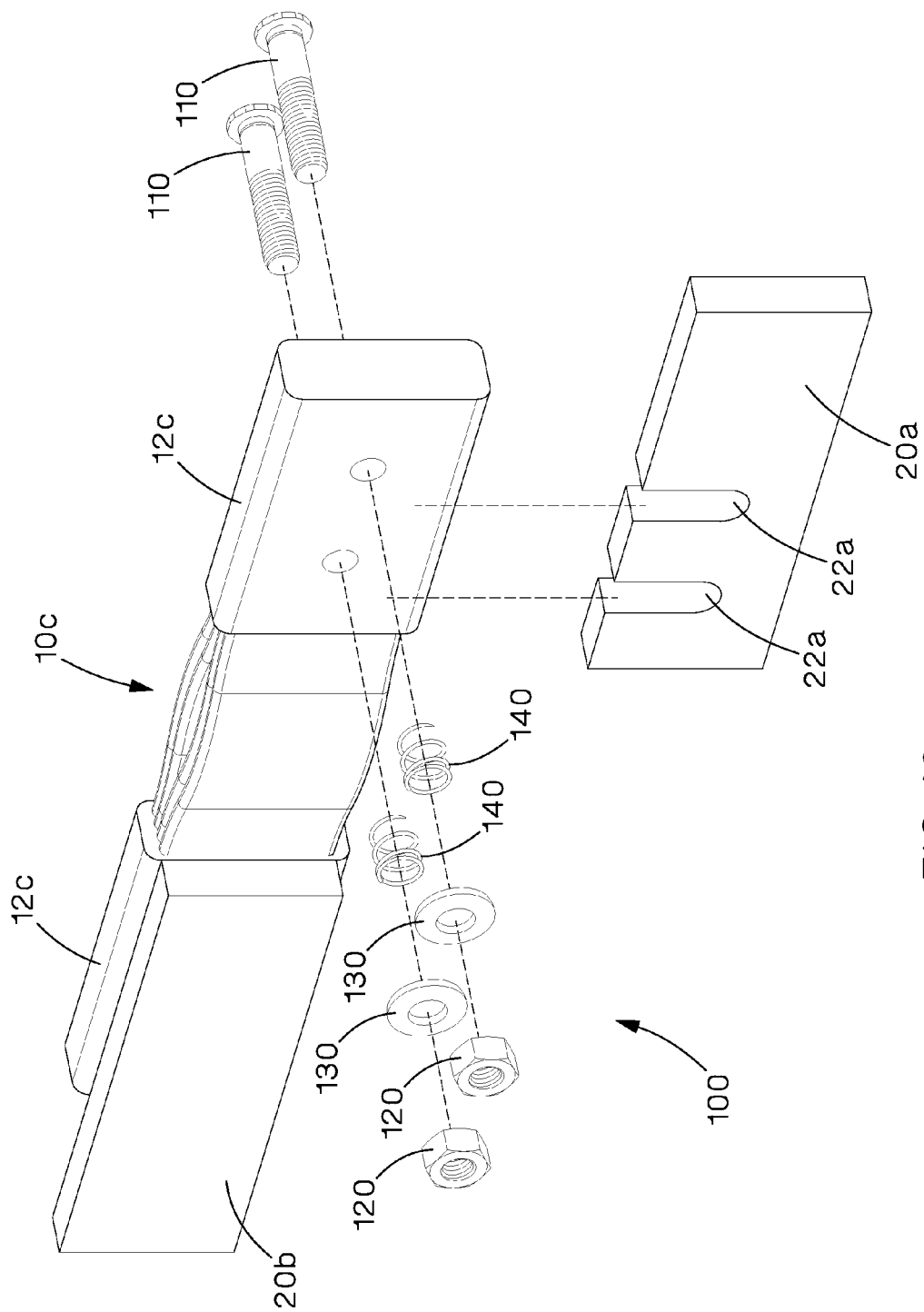
FIG. 10 illustrates a flexible busbar connector according to a fifth embodiment of the present invention.

As shown in FIG. 10, the terminated end 12c on the right side of flexible busbar connector 10c is connected to busbar 20a, for example, using captive fasteners 100, as described above with respect to FIGS. 1-4. However, the terminated end 12c on the left side of flexible busbar connector 10c is connected to busbar 20b, for example, using reactive bonding, brazing, soldering, or other such techniques.

Figure 11:
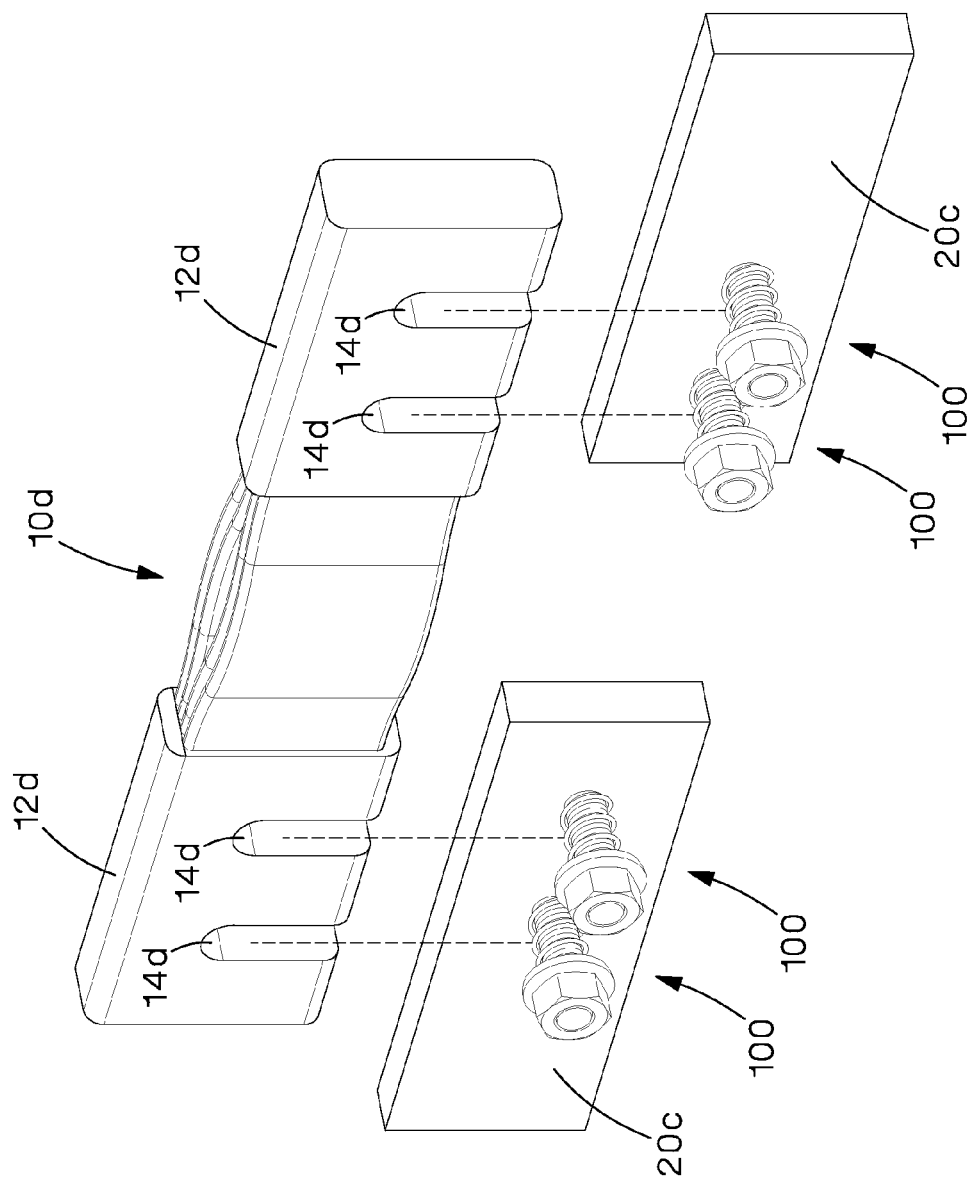
FIG. 11 illustrates a flexible busbar connector according to a sixth embodiment of the present invention.
Figure 12:
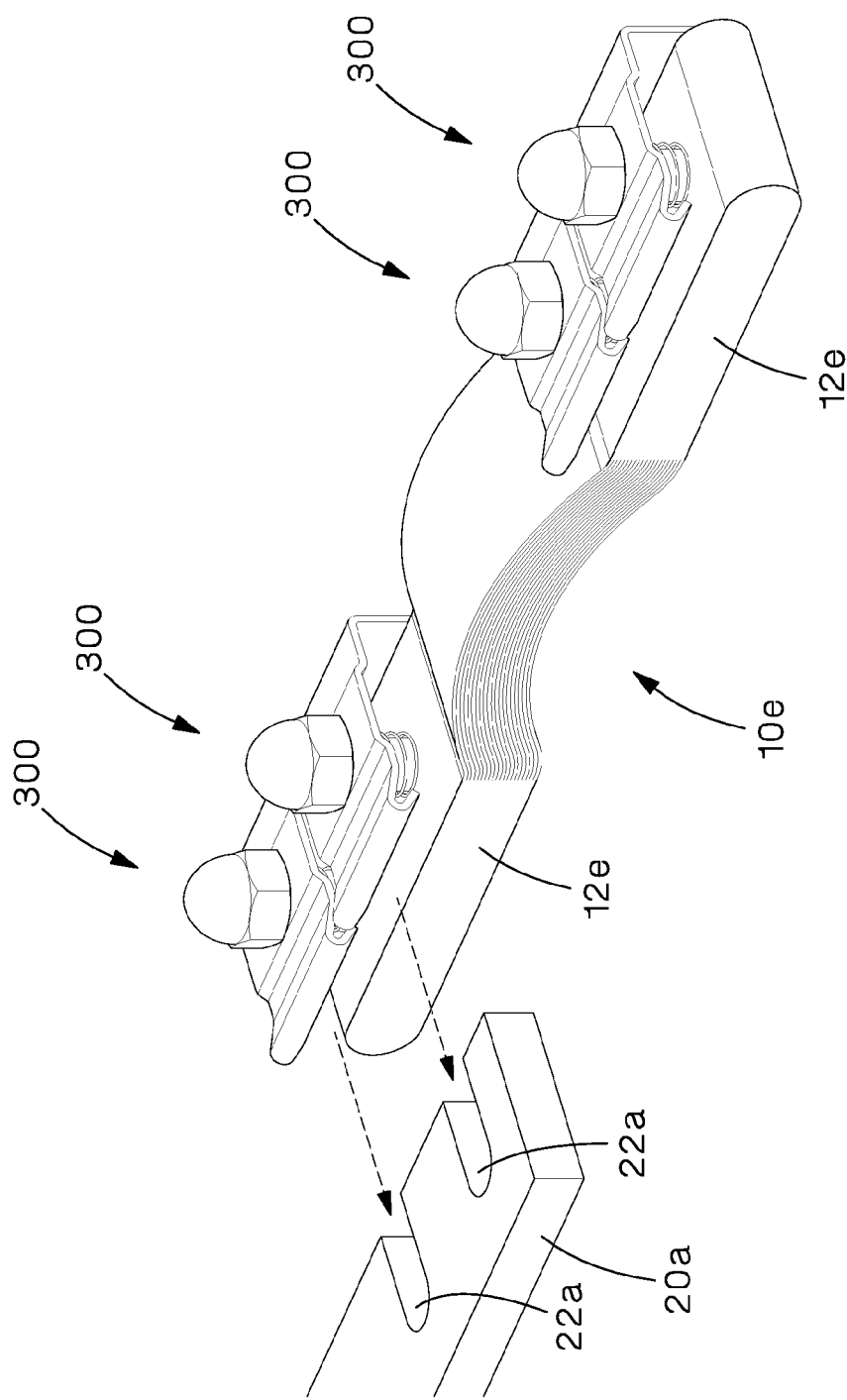
FIGS. 12-15 illustrates a flexible busbar connector according to a seventh embodiment of the present invention.
Figure 13:
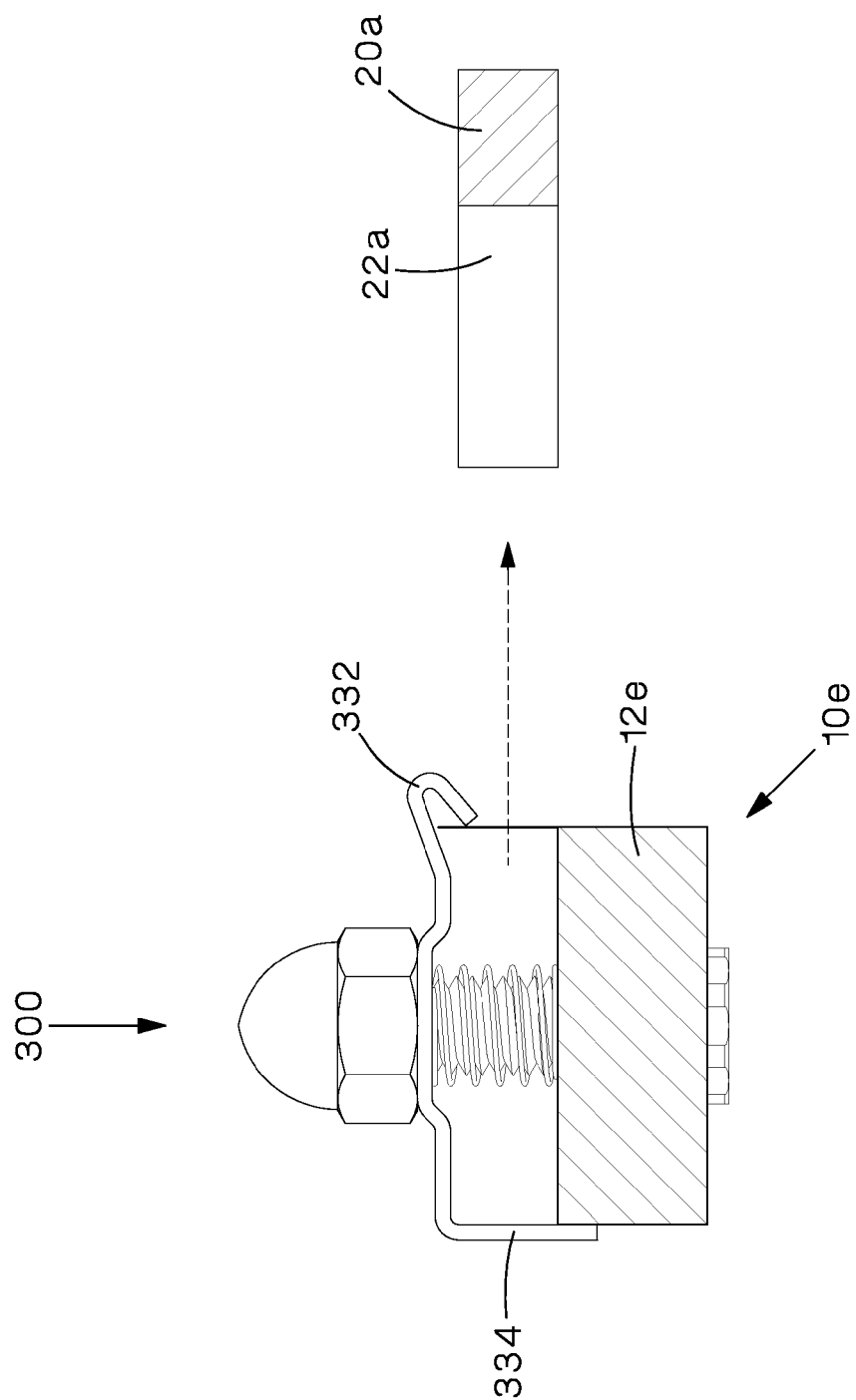
Figure 14:
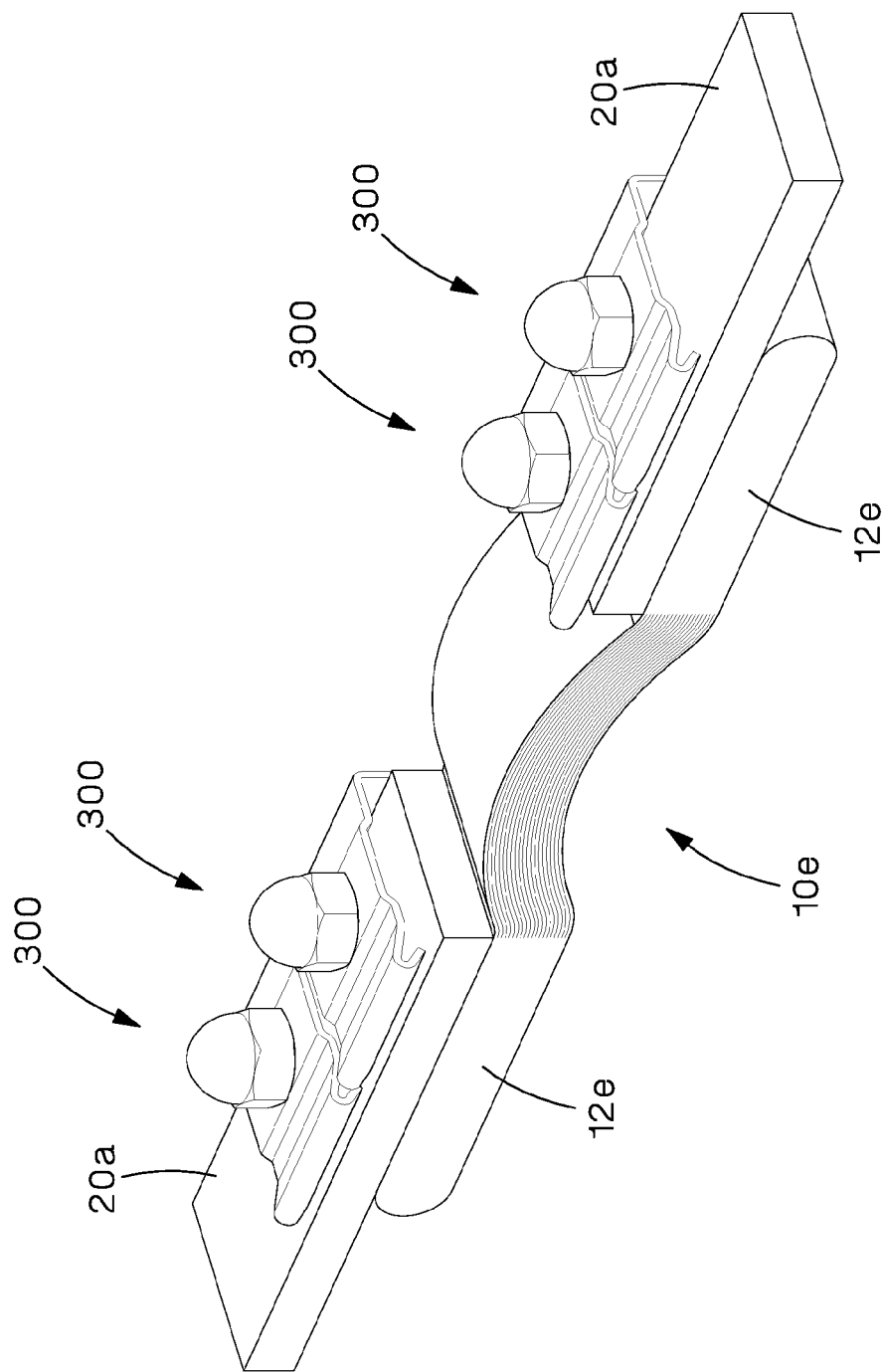
Figure 15:
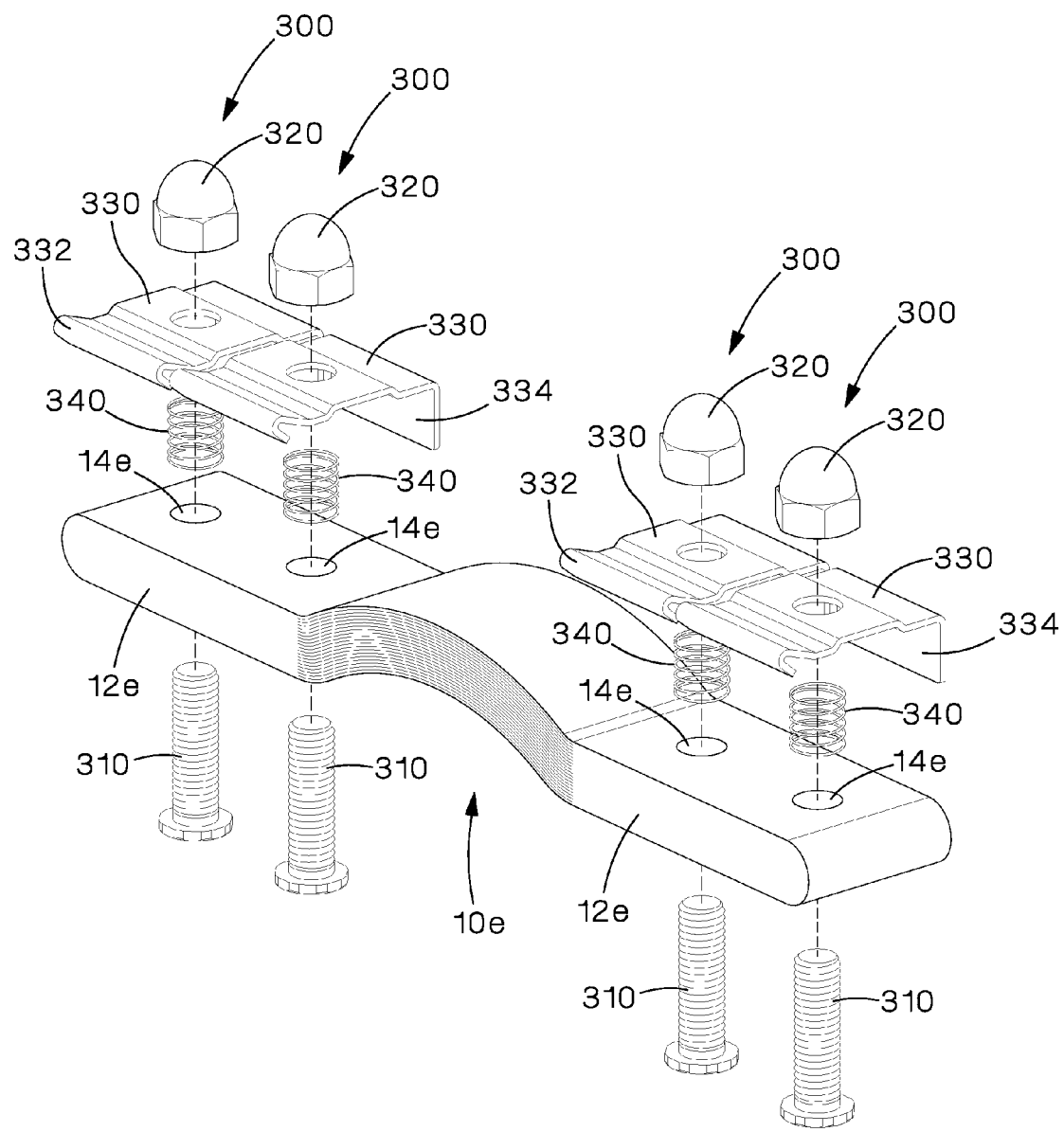
Figure 16:
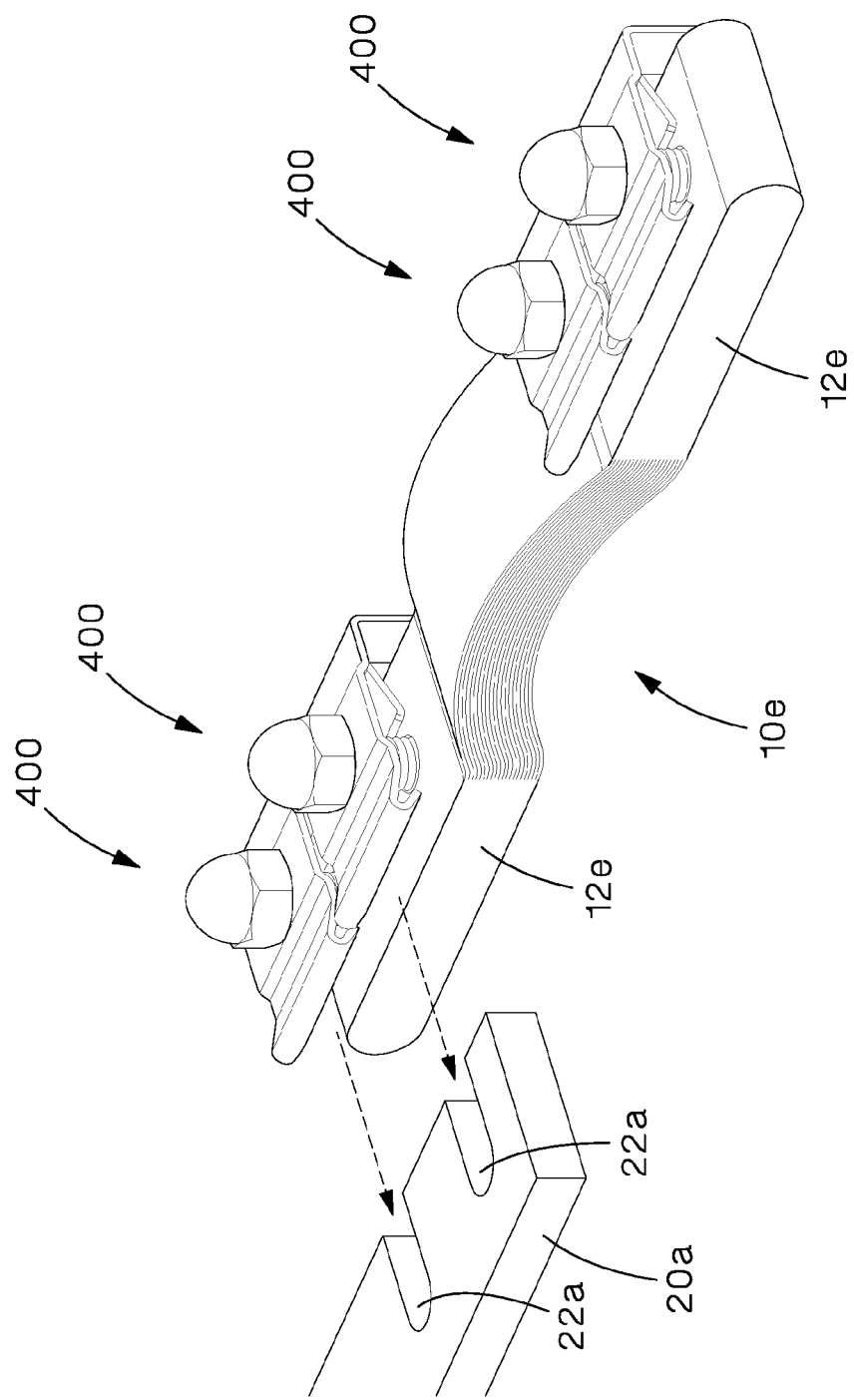
FIGS. 16-19 illustrates a flexible busbar connector according to an eighth embodiment of the present invention.
Figure 17:
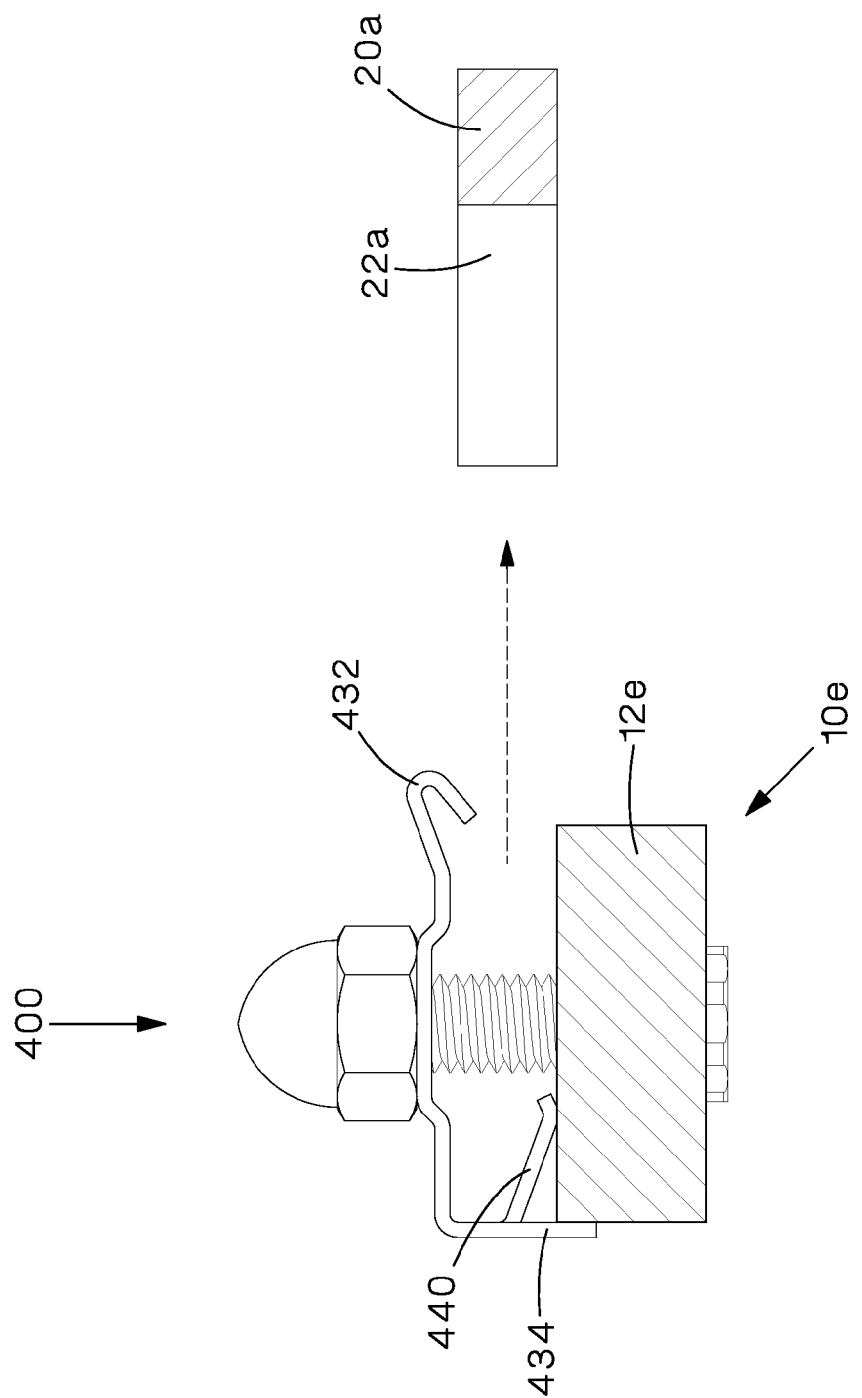
Figure 18:
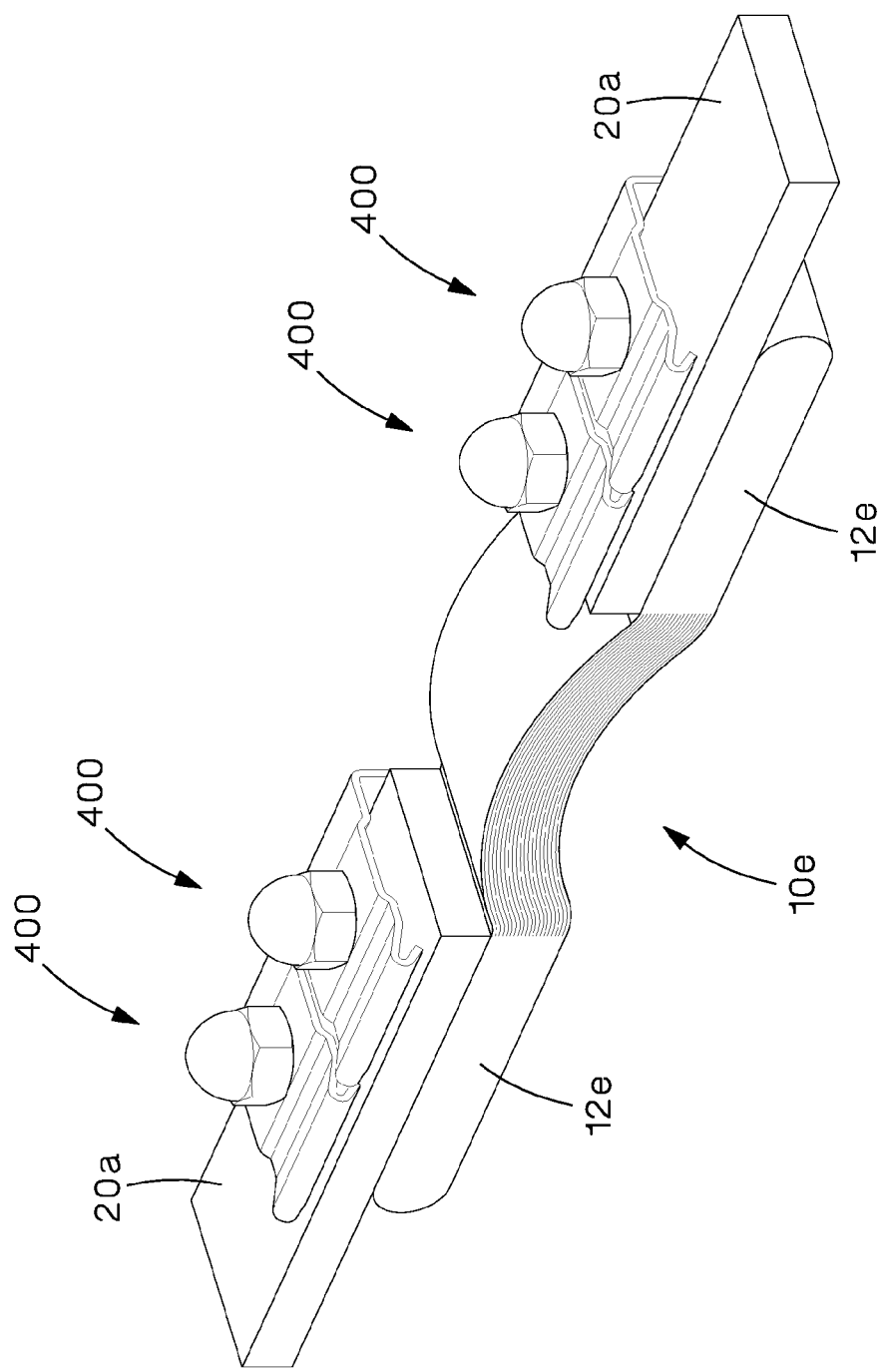
Figure 19:
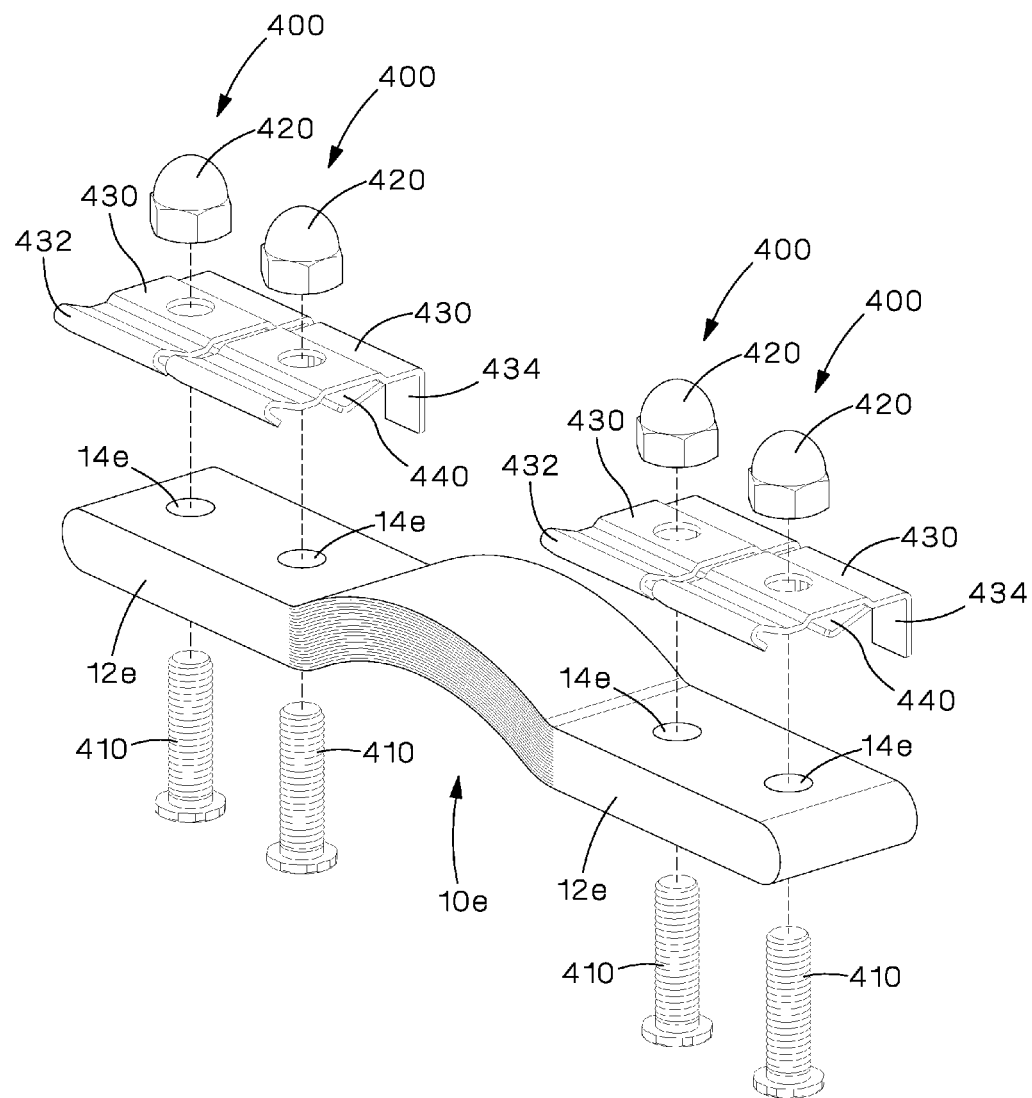

As shown in FIG. 11, busbars 20c include holes (not shown) for receiving captive fastener 100, and more particularly, press-fit threaded stud 110, and terminated ends 12d of flexible busbar connector 10d include open-ended slots 14d for receiving flexible busbar connector 10d, and more particularly, captive fastener 100.

As shown in FIGS. 12-15, captive fastener 300 includes press-fit threaded stud 310, acorn nut 320, clip 330, and compression spring 340. Terminated ends 12e of flexible busbar connector 10e include holes 14e for receiving captive fastener 300, and more particularly, press-fit threaded stud 310. Busbars 20a include open-ended slots 22a for receiving flexible busbar connector 10e, and more particularly, captive fastener 300. When captive fastener 300, and more particularly, nut 320 is loose, compression spring 340 provides clearance for sliding flexible busbar connector 10e onto busbar 20a. However, when captive fastener 300, and more particularly, nut 320 is tight, flexible busbar connector 10e is secured to busbar 20a. Preferably, clip 330 includes hook 332 and tab 334, which further secure flexible busbar connector 10e to busbar 20a, for example, during a short circuit.

As shown in FIGS. 16-19, captive fastener 400 includes press-fit threaded stud 410, acorn nut 420, clip 430, and spring finger 440. Terminated ends 12e of flexible busbar connector 10e include holes 14e for receiving captive fastener 400, and more particularly, press-fit threaded stud 410. Busbars 20a include open-ended slots 22a for receiving flexible busbar connector 10e, and more particularly, captive fastener 400. When captive fastener 400, and more particularly, nut 420 is loose, spring finger 440 provides clearance for sliding flexible busbar connector 10e onto busbar 20a. However, when captive fastener 400, and more particularly, nut 420 is tight, flexible busbar connector 10e is secured to busbar 20a. Preferably, clip 430 includes hook 432 and tab 434, which further secure flexible busbar connector 10e to busbar 20a, for example, during a short circuit.

Figure 20:
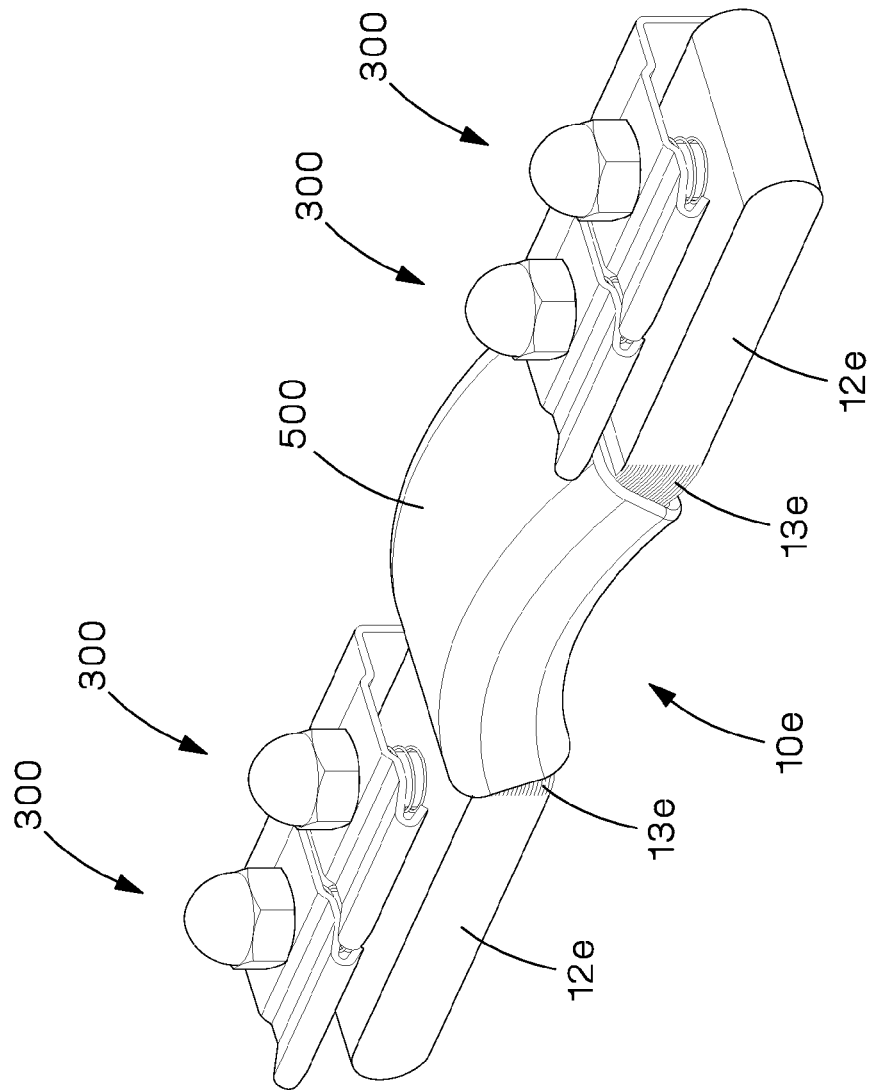
FIG. 20 illustrates a flexible busbar connector according to a ninth embodiment of the present invention.

As shown in FIG. 20, flexible busbar connector 10e includes sleeve 500, such as heat shrink sleeve or fire sleeve, for protecting flexible busbar connector 10e, and more particularly, flexible electrical conductors 13e, such as braided strap or laminated stacked plates, for example, from contaminants, such as dirt, and hazards, such as fire.

Figure 21:
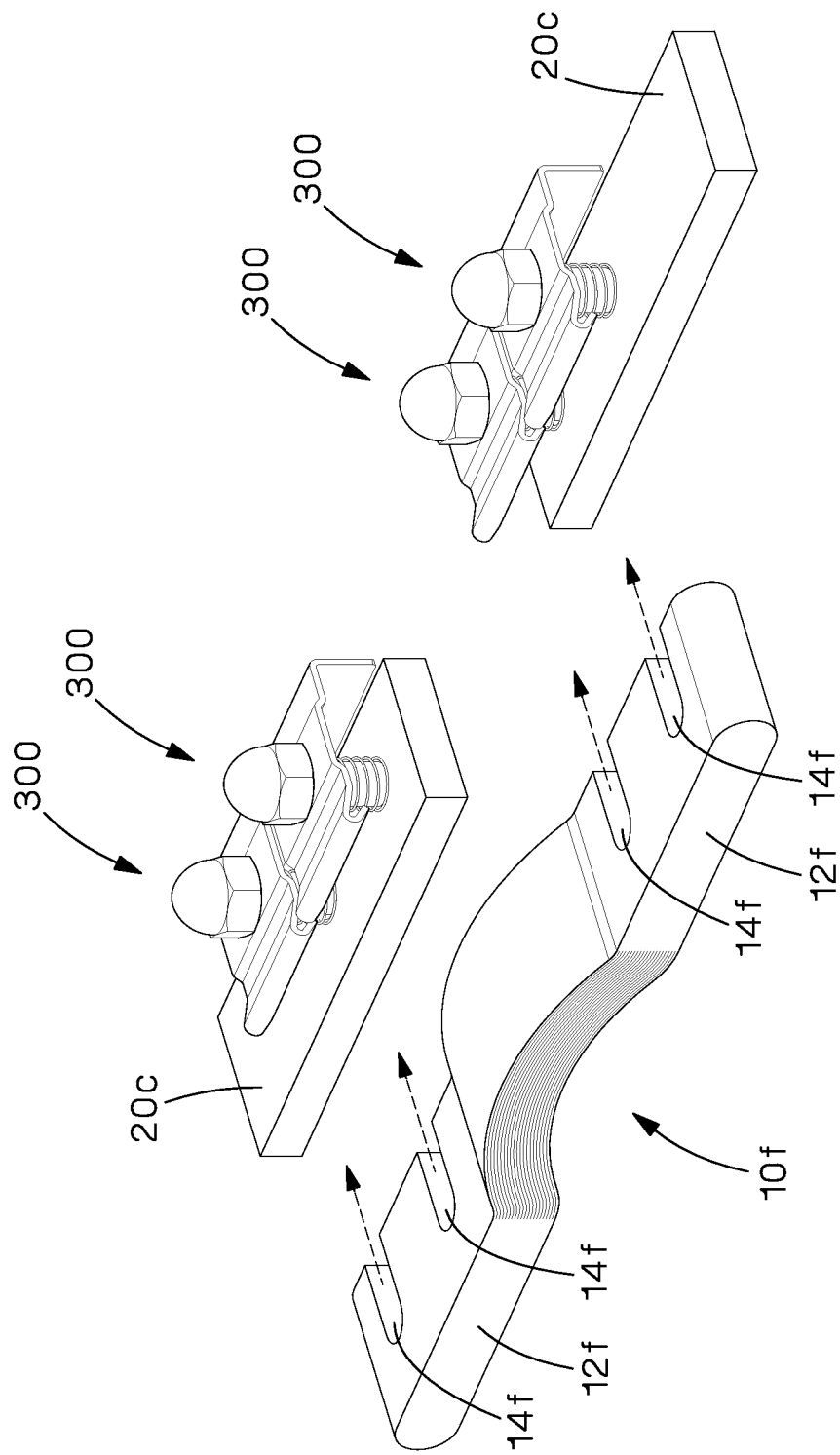
FIG. 21 illustrates a flexible busbar connector according to a tenth embodiment of the present invention.

As shown in FIG. 21, busbars 20c include holes (not shown) for receiving captive fastener 300, and more particularly, press-fit threaded stud 310, and terminated ends 12f of flexible busbar connector 10f include open-ended slots 14f for receiving flexible busbar connector 10f, and more particularly, captive fastener 300.

Figure 22:
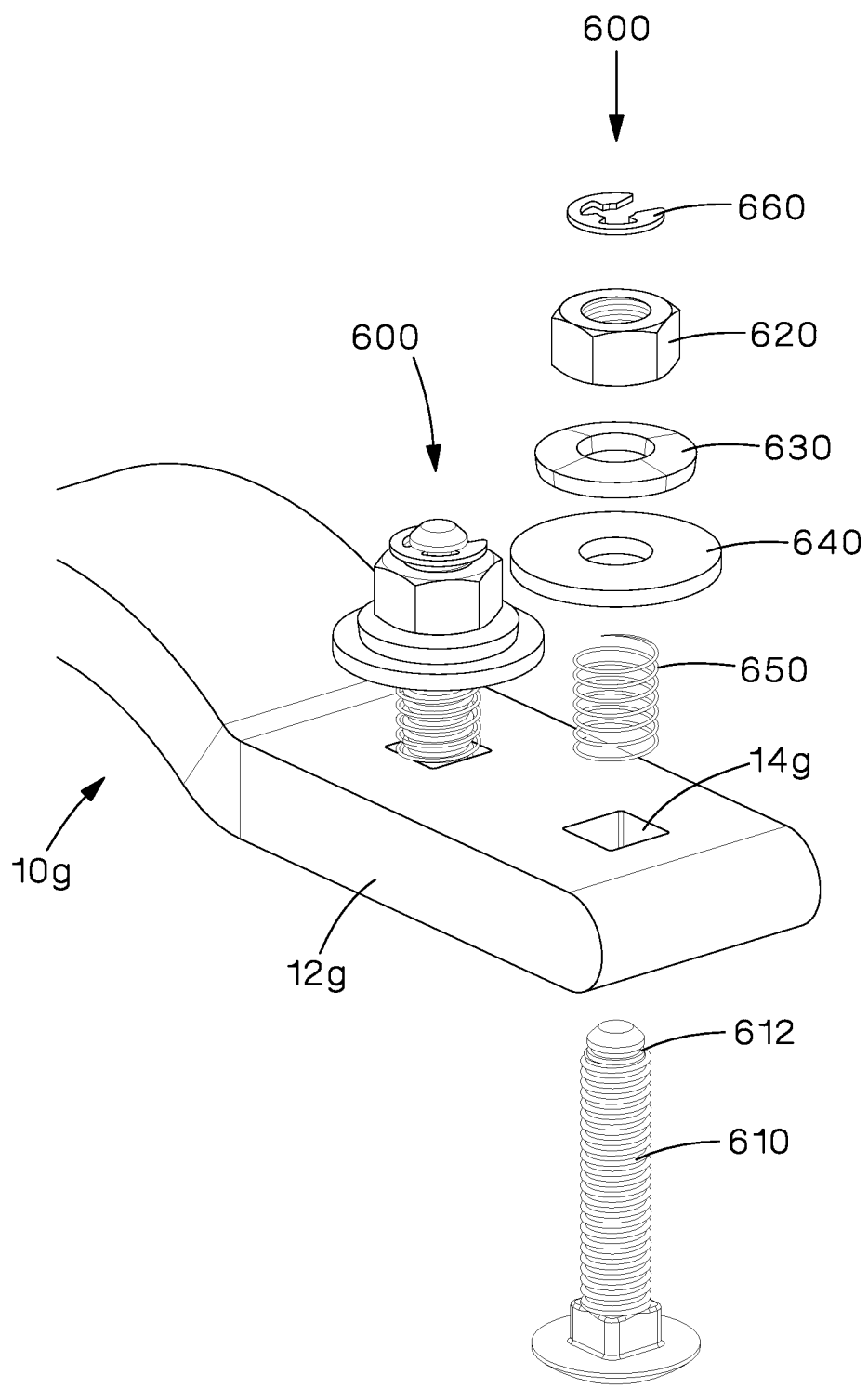
FIGS. 22 and 23 illustrate a flexible busbar connector according to an eleventh embodiment of the present invention.
Figure 23:
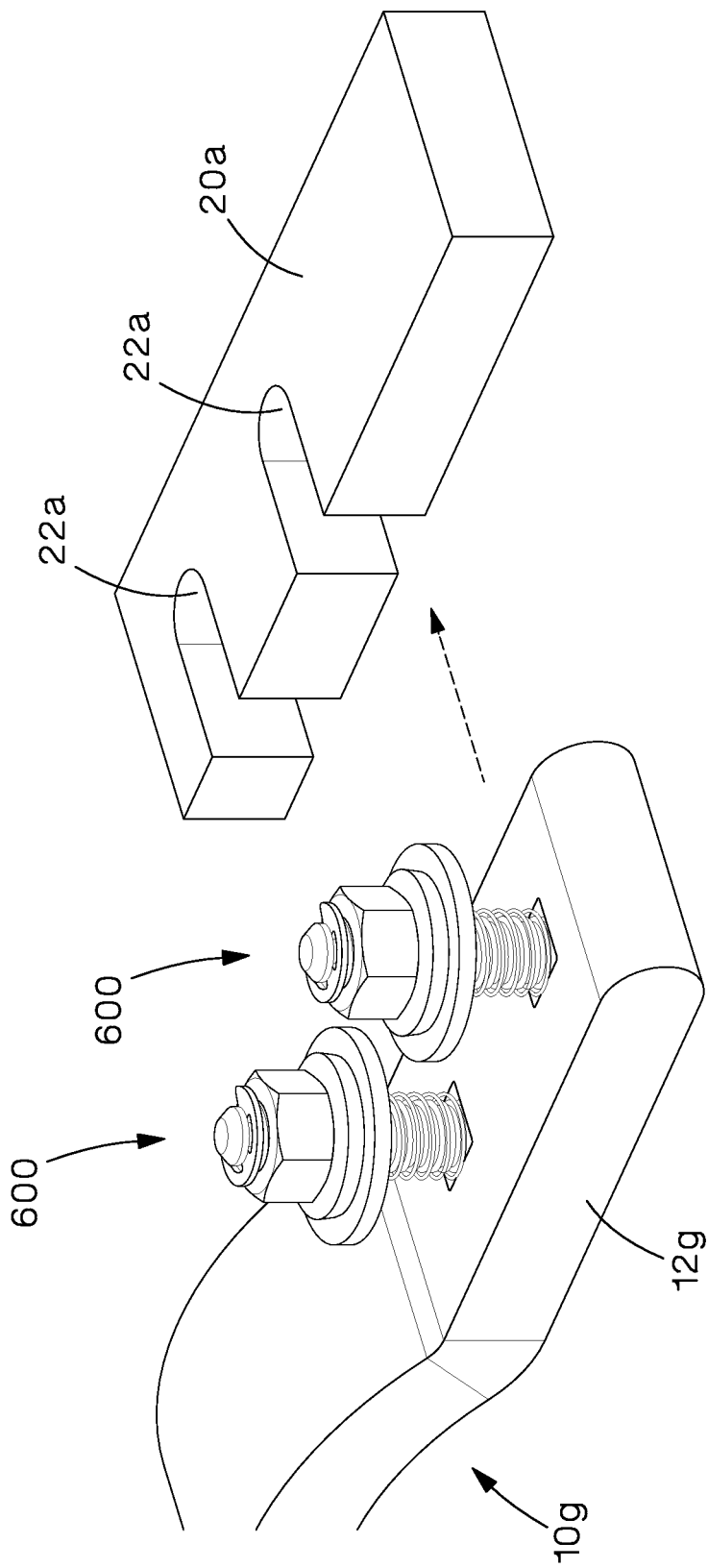

As shown in FIGS. 22 and 23, captive fastener 600 includes carriage bolt 610, nut 620, Belleville washer 630, flat washer 640, compression spring 650, and e-clip 660. Terminated ends 12g of flexible busbar connector 10g include square holes 14g for receiving captive fastener 600, and more particularly, carriage bolt 610. Preferably, carriage bolt 610 is threaded and sized to press fit into square hole 14g. Busbars 20a include open-ended slots 22a for receiving flexible busbar connector 10g, and more particularly, captive fastener 600. When captive fastener 600, and more particularly, nut 620 is loose, compression spring 650 provides clearance for sliding flexible busbar connector 10g onto busbar 20a. However, when captive fastener 600, and more particularly, nut 620 is tight, flexible busbar connector 10g is secured to busbar 20a. Preferably, the end of carriage bolt 610 is not threaded and includes groove 612 for receiving e-clip 660, which prevents removal of nut 620 from carriage bolt 610, further securing flexible busbar connector 10g to busbar 20a.

Figure 24:
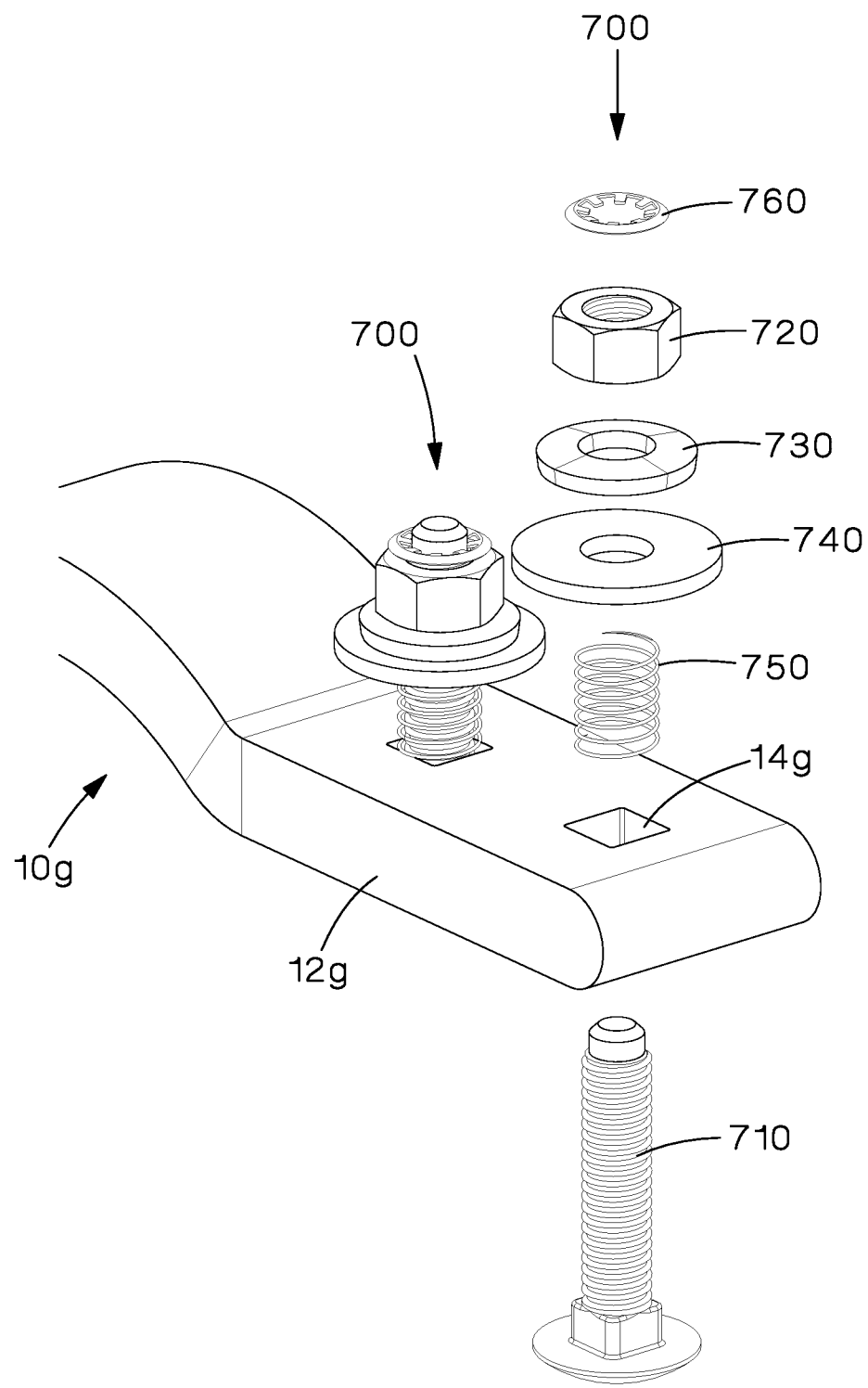
FIG. 24 illustrates a flexible busbar connector according to a twelfth embodiment of the present invention.

As shown in FIG. 24, captive fastener 700 includes carriage bolt 710, nut 720, Belleville washer 730, flat washer 740, compression spring 750, and push-on-clip 760. Terminated ends 12g of flexible busbar connector 10g include square holes 14g for receiving captive fastener 700, and more particularly, carriage bolt 710. Preferably, carriage bolt 710 is threaded and sized to press fit into square hole 14g. Busbars 20a include open-ended slots 22a for receiving flexible busbar connector 10g, and more particularly, captive fastener 700. When captive fastener 700, and more particularly, nut 720 is loose, compression spring 750 provides clearance for sliding flexible busbar connector 10g onto busbar 20a. However, when captive fastener 700, and more particularly, nut 720 is tight, flexible busbar connector 10g is secured to busbar 20a. Preferably, the end of carriage bolt 710 is not threaded and receives push-on clip 760, which prevents removal of nut 720 from carriage bolt 710, further securing flexible busbar connector 10g to busbar 20a.

Figure 25:
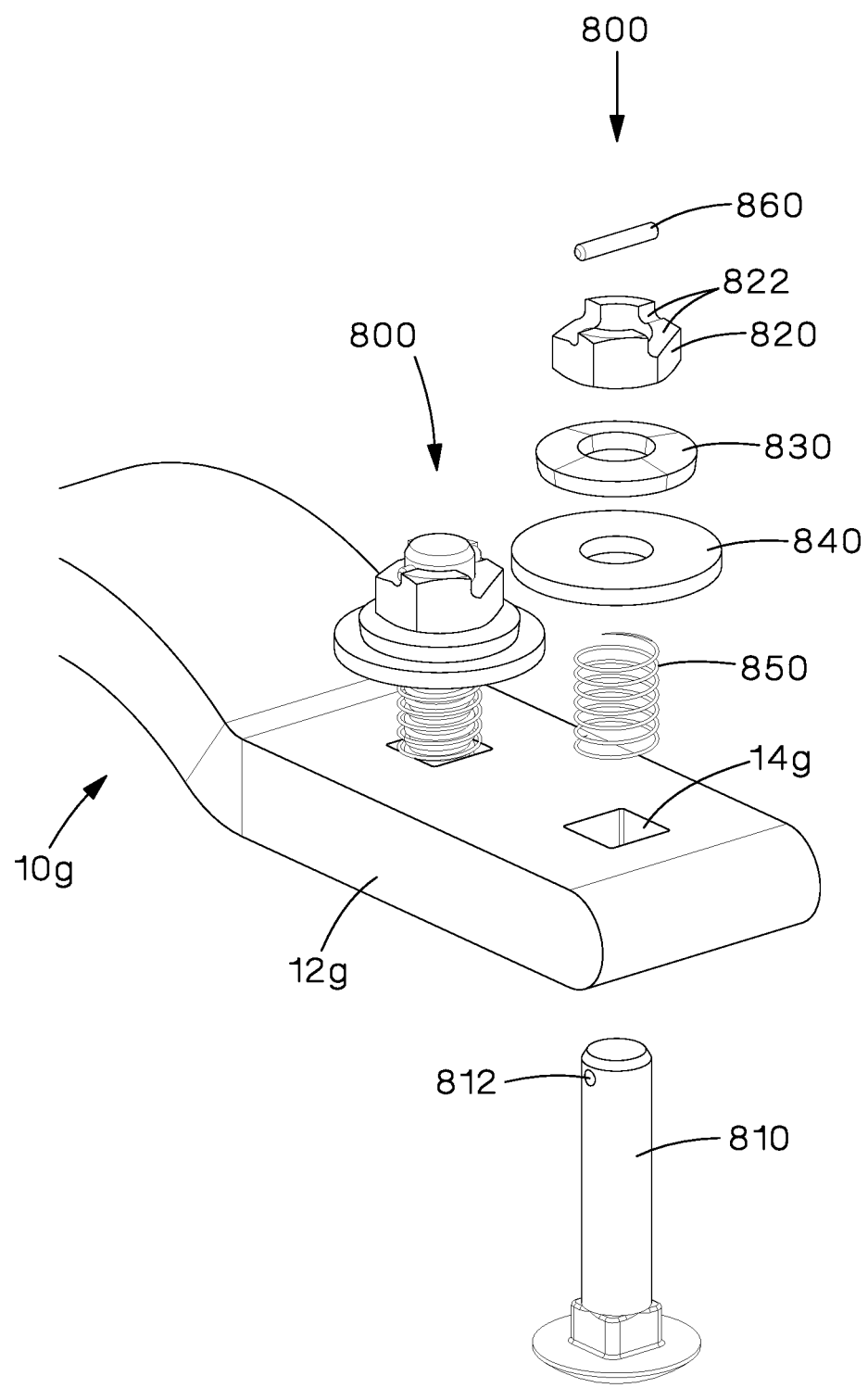
FIGS. 25 and 26 illustrate a flexible busbar connector according to a thirteenth embodiment of the present invention.
Figure 26:
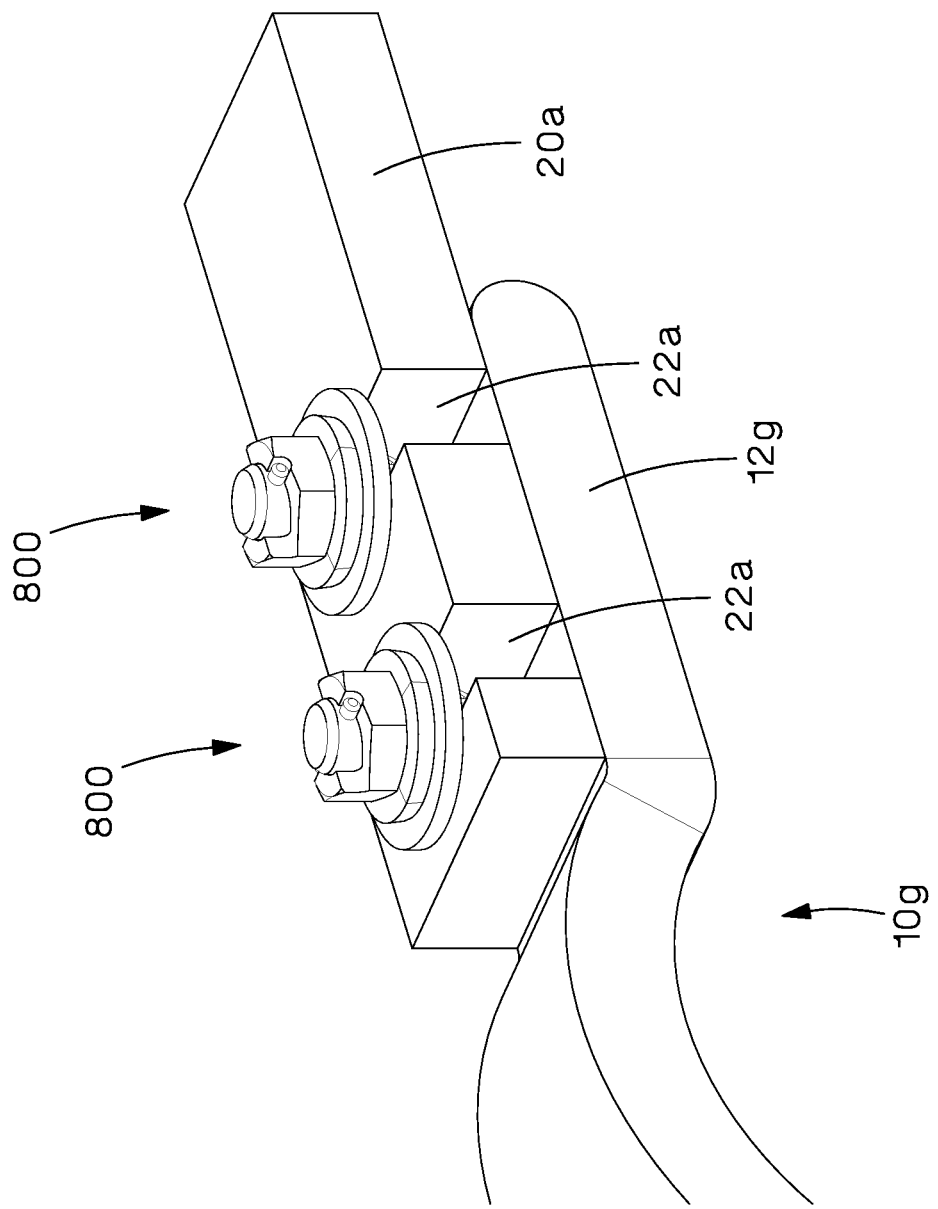

Alternatively, as shown in FIGS. 25 and 26, captive fastener 800 includes carriage bolt 810, quarter-turn nut 820, Belleville washer 830, flat washer 840, compression spring 850, and pin 860. Terminated ends 12g of flexible busbar connector 10g include square holes 14g for receiving captive fastener 800, and more particularly, carriage bolt 810. Preferably, carriage bolt 810 is not threaded and sized to press fit into square hole 14g. Busbars 20a include open-ended slots 22a for receiving flexible busbar connector 10g, and more particularly, captive fastener 800. When captive fastener 800, and more particularly, quarter-turn nut 820 is loose, compression spring 850 provides clearance for sliding flexible busbar connector 10g onto busbar 20a. However, when captive fastener 800, and more particularly, quarter-turn nut 820 is tight, flexible busbar connector 10g is secured to busbar 20a. Preferably, the end of carriage bolt 810 includes hole 812 for receiving pin 860, which engages ramp/cam surfaces 822 of quarter turn nut 820 to prevent removal of quarter turn nut 820 from carriage bolt 820, further securing flexible busbar connector 10g to busbar 20a.

Figure 27:
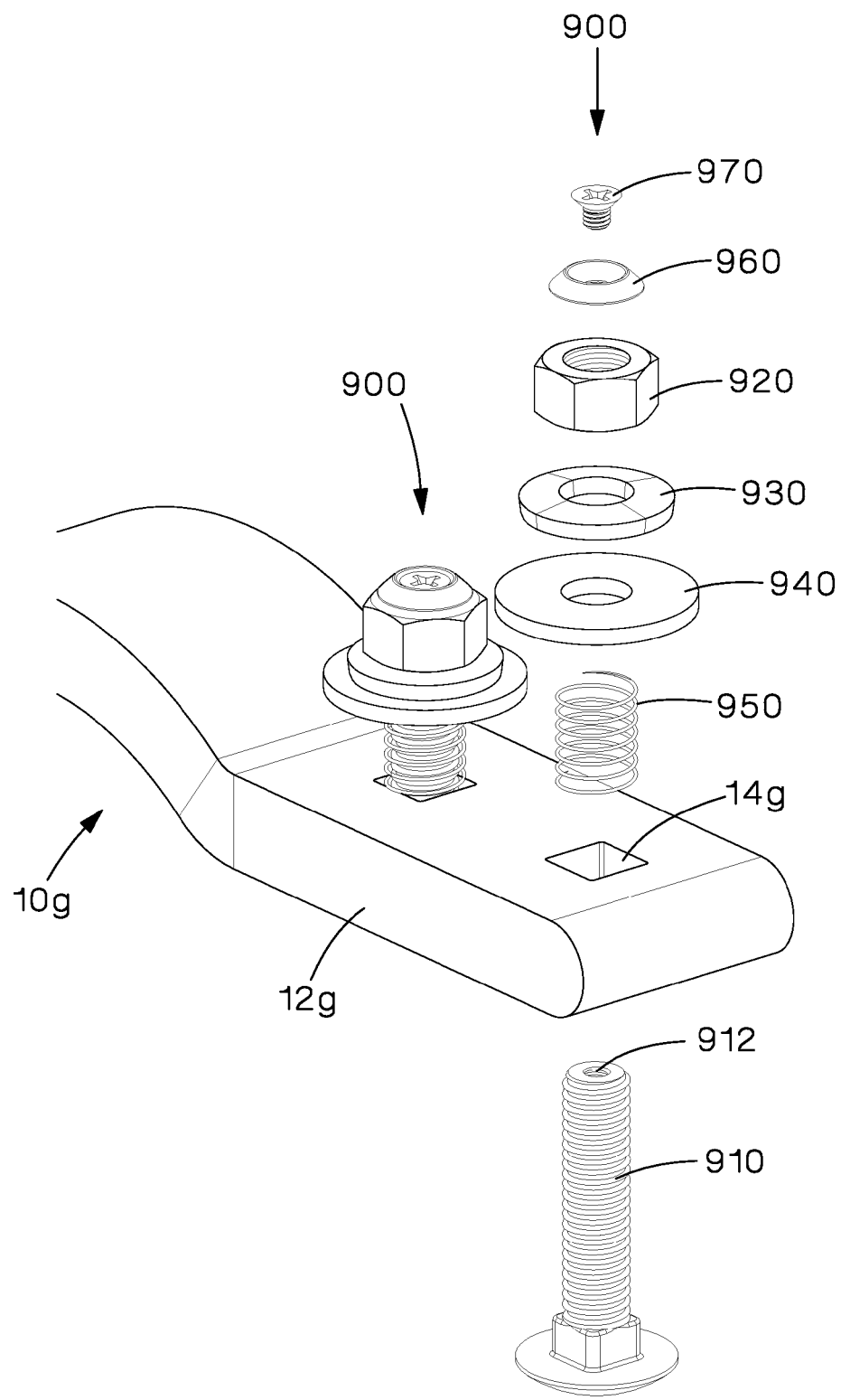
FIG. 27 illustrates a flexible busbar connector according to a fourteenth embodiment of the present invention.

As shown in FIG. 27 captive fastener 900 includes carriage bolt 910, nut 920, Belleville washer 930, flat washer 940, compression spring 950, countersunk washer 960, and flat-head screw 970. Terminated ends 12g of flexible busbar connector 10g include square holes 14g for receiving captive fastener 900, and more particularly, carriage bolt 910. Preferably, carriage bolt 910 is threaded and sized to press fit into square hole 14g. Busbars 20a include open-ended slots 22a for receiving flexible busbar connector 10g, and more particularly, captive fastener 900. When captive fastener 900, and more particularly, nut 920 is loose, compression spring 950 provides clearance for sliding flexible busbar connector 10g onto busbar 20a. However, when captive fastener 900, and more particularly, nut 920 is tight, flexible busbar connector 10g is secured to busbar 20a. Preferably, the end of carriage bolt 910 includes a threaded hole 912 for receiving flat-head screw 970, which prevents removal of nut 920 from carriage bolt 910, further securing flexible busbar connector 10g to busbar 20a. The threads of flat head screw 910 are reversed, which resists removal when nut 920 is tightened.

Figure 28:
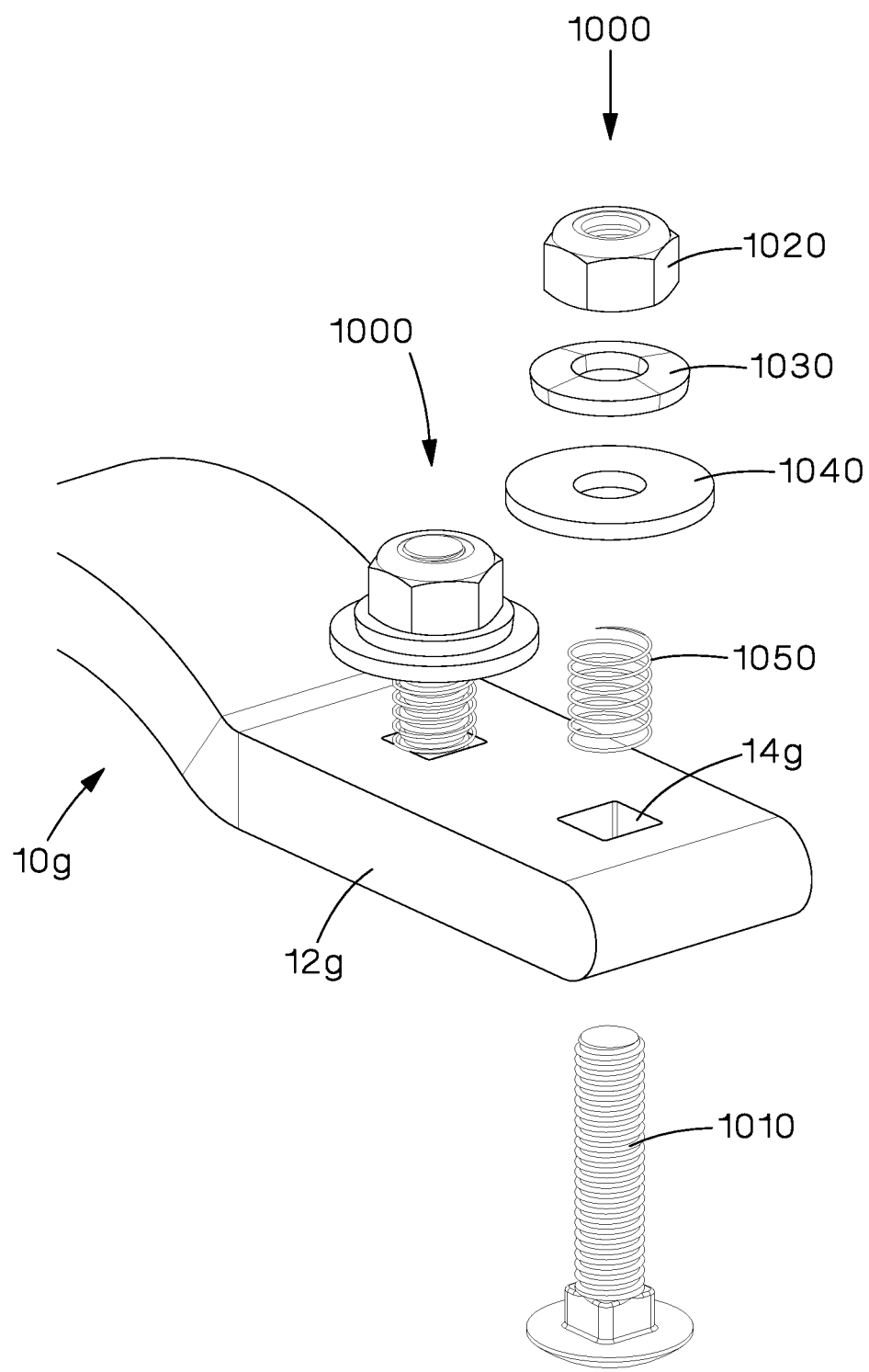
FIG. 28 illustrates a flexible busbar connector according to a fifteenth embodiment of the present invention.

As shown in FIG. 28, captive fastener 1000 includes carriage bolt 1010, lock nut 1020, Belleville washer 1030, flat washer 1040, and compression spring 1050. Terminated ends 12g of flexible busbar connector 10g include square holes 14g for receiving captive fastener 1000, and more particularly, carriage bolt 1010. Preferably, carriage bolt 1010 is threaded and sized to press fit into square hole 14g. Busbars 20a include open-ended slots 22a for receiving flexible busbar connector 10g, and more particularly, captive fastener 1000. When captive fastener 1000, and more particularly, lock nut 1020 is loose, compression spring 1050 provides clearance for sliding flexible busbar connector 10g onto busbar 20a. However, when captive fastener 1000, and more particularly, lock nut 1020 is tight, flexible busbar connector 10g is secured to busbar 20a. Preferably, lock nut 1020 includes a thread locker, such as Nyloc® or Loctite®, which prevents removal of nut 1020 from carriage bolt 1010, further securing flexible busbar connector 10g to busbar 20a.

Figure 29:
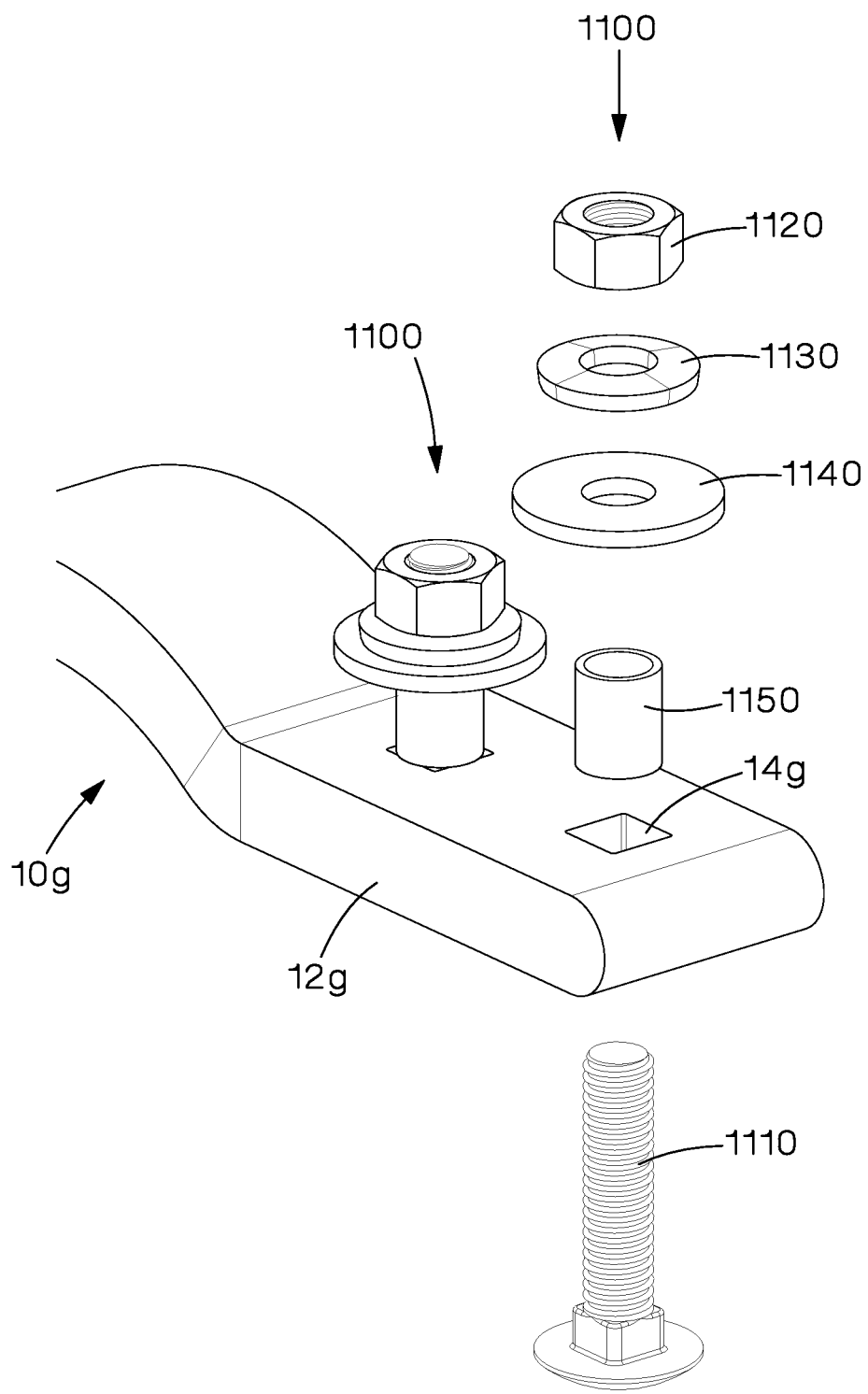
FIG. 29 illustrates a flexible busbar connector according to a sixteenth embodiment of the present invention.

As shown in FIG. 29, captive fastener 1100 includes carriage bolt 1110, nut 1120, Belleville washer 1130, flat washer 1140, and elastomeric sleeve 1150. Terminated ends 12g of flexible busbar connector 10g include square holes 14g for receiving captive fastener 1100, and more particularly, carriage bolt 1110. Preferably, carriage bolt 1110 is threaded and sized to press fit into square hole 14g. Busbars 20a include open-ended slots 22a for receiving flexible busbar connector 10g, and more particularly, captive fastener 1100. When captive fastener 1100, and more particularly, nut 1120 is loose, elastomeric sleeve 1150 provides clearance for sliding flexible busbar connector 10g onto busbar 20a. However, when captive fastener 1100, and more particularly, nut 1120 is tight, flexible busbar connector 10g is secured to busbar 20a.

Figure 30:
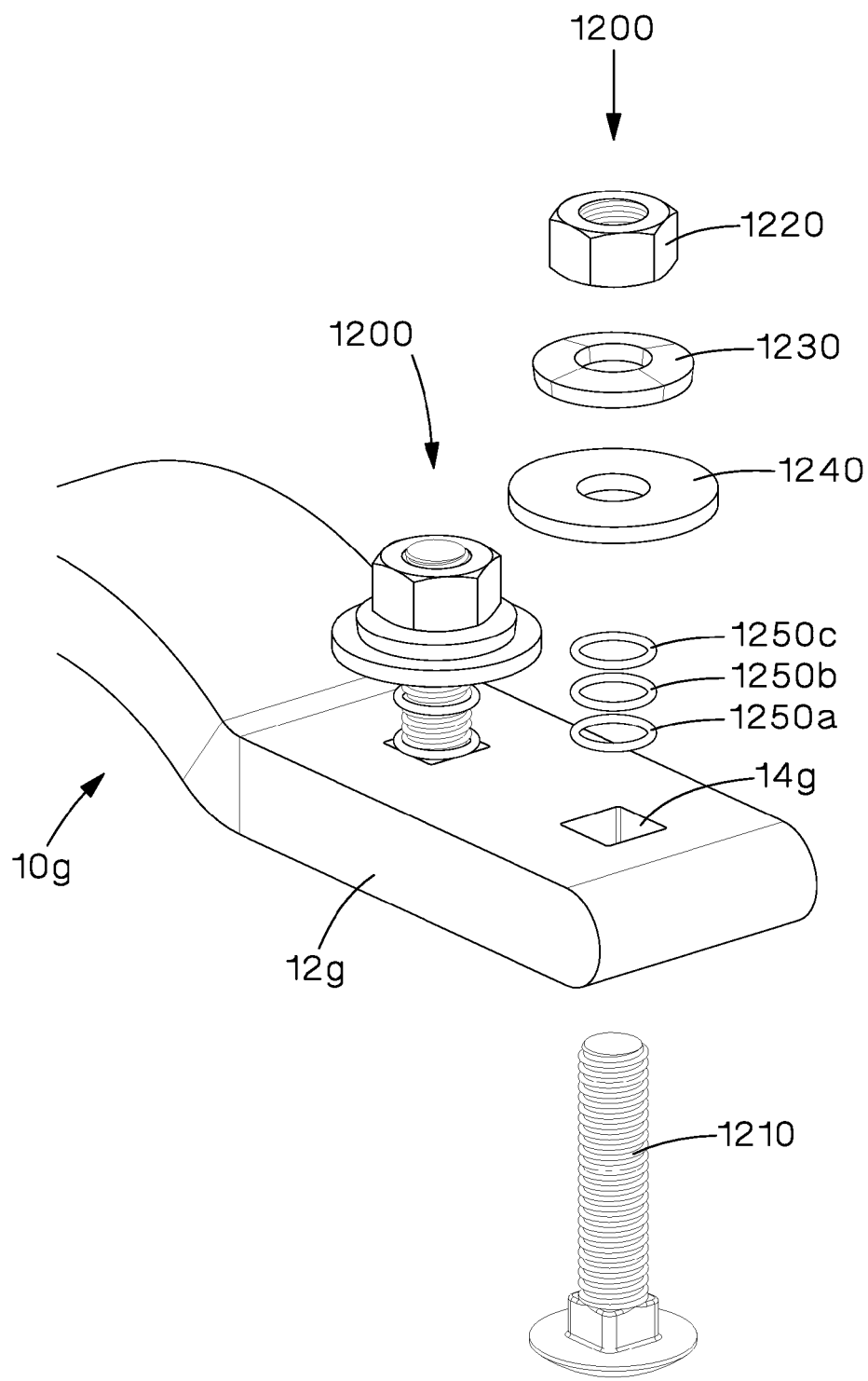
FIG. 30 illustrates a flexible busbar connector according to a seventeenth embodiment of the present invention.

As shown in FIG. 30, captive fastener 1200 includes carriage bolt 1210, nut 1220, Belleville washer 1230, flat washer 1240, and three rubber o-rings 1250a, 1250b, 1250c. Terminated ends 12g of flexible busbar connector 10g include square holes 14g for receiving captive fastener 1200, and more particularly, carriage bolt 1210. Preferably, carriage bolt 1210 is threaded and sized to press fit into square hole 14g. Rubber o-ring 1250a supports carriage bolt 1210 in square hole 14g. Busbars 20a include open-ended slots 22a for receiving flexible busbar connector 10g, and more particularly, captive fastener 1200. Rubber o-ring 1250b centers carriage bolt 1210 in open-ended slots 22a. When captive fastener 1200, and more particularly, nut 1220 is loose, rubber o-ring 1250c provides clearance for sliding flexible busbar connector 10g onto busbar 20a. However, when captive fastener 1200, and more particularly, nut 1220 is tight, flexible busbar connector 10g is secured to busbar 20a.

Figure 31:
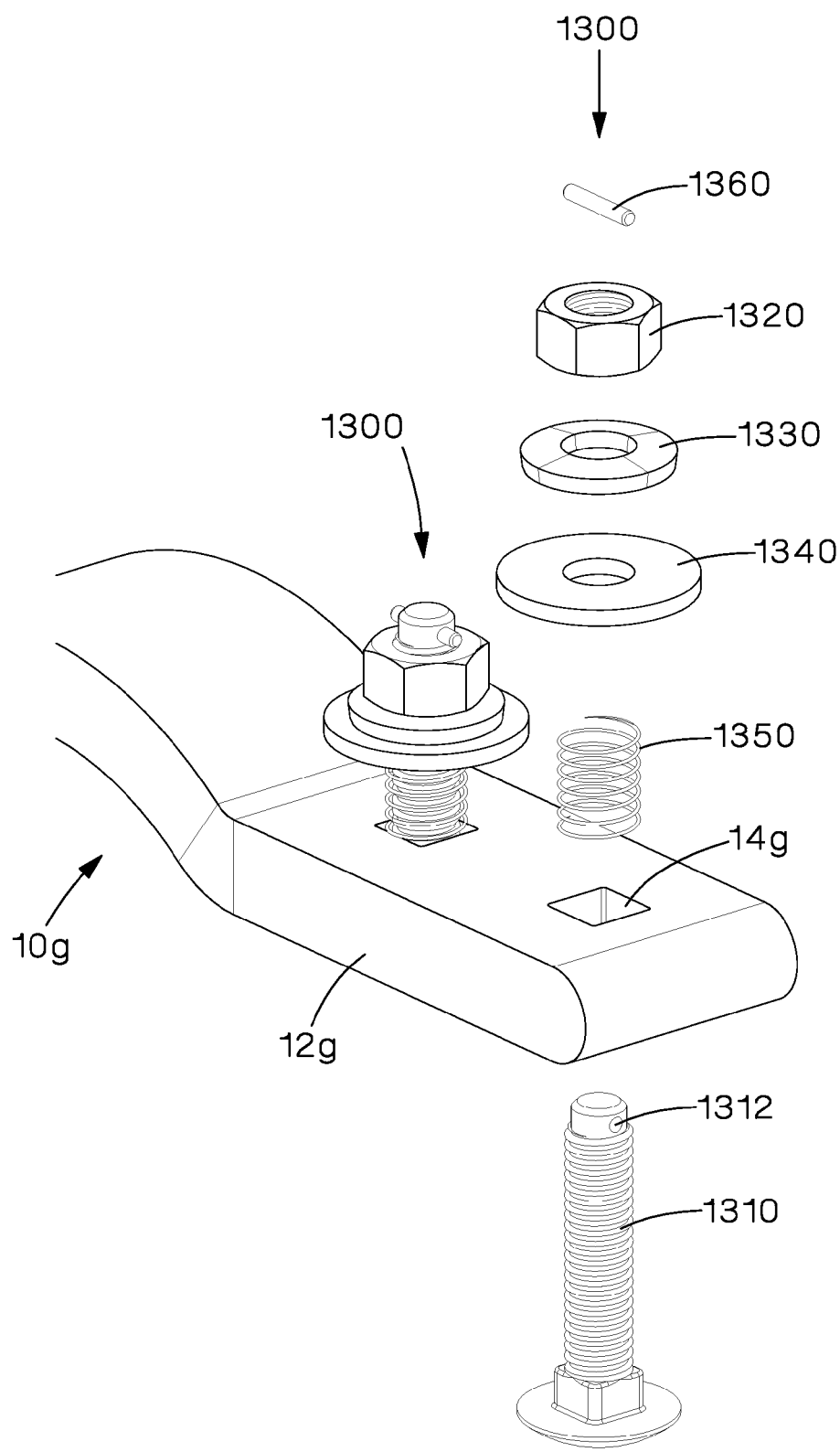
FIGS. 31 and 32 illustrate a flexible busbar connector according to an eighteenth embodiment of the present invention.
Figure 32:
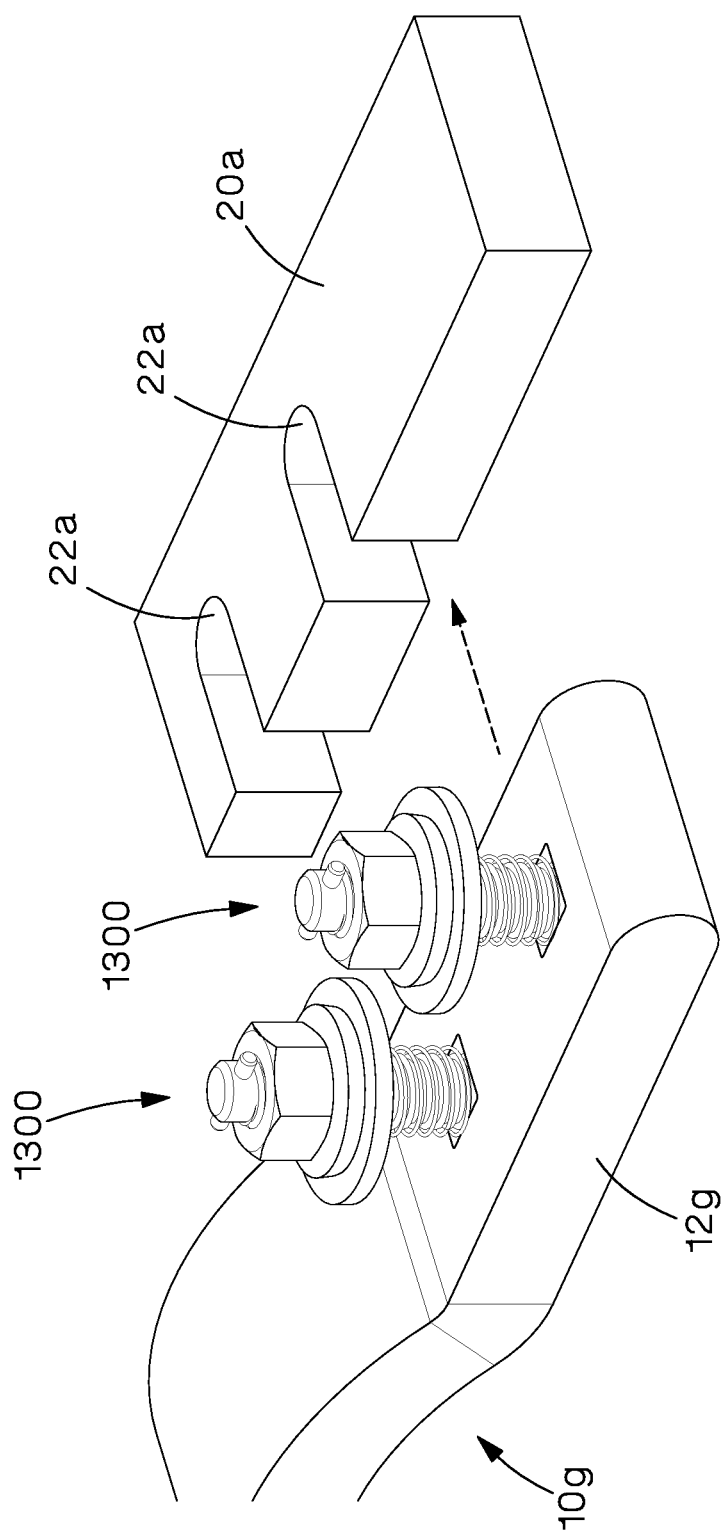

As shown in FIGS. 31 and 32, captive fastener 1300 includes carriage bolt 1310, nut 1320, Belleville washer 1330, flat washer 1340, compression spring 1350, and pin 1360. Terminated ends 12g of flexible busbar connector 10g include square holes 14g for receiving captive fastener 1300, and more particularly, carriage bolt 1310. Preferably, carriage bolt 1310 is threaded and sized to press fit into square hole 14g. Busbars 20a include open-ended slots 22a for receiving flexible busbar connector 10g, and more particularly, captive fastener 1300. When captive fastener 1300, and more particularly, nut 1320 is loose, compression spring 1350 provides clearance for sliding flexible busbar connector 10g onto busbar 20a. However, when captive fastener 1300, and more particularly, nut 1320 is tight, flexible busbar connector 10g is secured to busbar 20a. Preferably, the end of carriage bolt 1310 is not threaded and includes hole 1312 for receiving pin 1360, which prevents removal of nut 1320 from carriage bolt 1310, further securing flexible busbar connector 10g to busbar 20a.

While the components/features of the busbars, the flexible busbar connectors, and the captive fasteners are described above with respect to specific exemplary embodiments, it is likewise contemplated that these components/features may be combined. For example, elastomeric sleeve 1150 of captive fastener 1100 may be combined with captive fastener 600, replacing compression spring 650.

While this invention has been described in conjunction with the exemplary embodiments outlined above, various alternatives, modifications, variations, and/or improvements, whether known or presently unforeseen, may become apparent. Accordingly, the exemplary embodiments of the invention as set forth above are intended to be illustrative, not limiting. Various changes may be made without departing from the spirit and scope of the invention.

The invention claimed is:

1. A flexible electrical connector for electrical equipment, the flexible electrical connector comprising:
    a flexible electrical conductor,
    a terminated end electrically and mechanically connected to the flexible electrical conductor, and
    a captive fastener for electrically and mechanically connecting the electrical equipment to the terminated end, the captive fastener operably connected to the terminated end and comprising a shaft operably connected to the terminated end, a rotatable member operably connected to the shaft, and a coil spring operably connected to the shaft and disposed between the rotatable member and the terminated end.

2. The flexible electrical connector of claim 1, wherein the terminated end comprises a hole for receiving the shaft.

3. The flexible electrical connector of claim 2, wherein the shaft is press-fit into the hole.

4. The flexible electrical connector of claim 1, wherein the shaft comprises a threaded shaft.

5. The flexible connector of claim 4, wherein the terminated end comprises a threaded hole for receiving the threaded shaft.

6. The flexible electrical connector of claim 1, wherein the rotatable member is rotatably connected to the shaft.

7. The flexible connector of claim 1, wherein the rotatable member is integrally formed with the shaft and the shaft is rotatably connected to the terminated end.

8. The flexible electrical connector of claim 1, wherein the rotatable member comprises a nut.

9. The flexible electrical connector of claim 1, wherein the captive fastener comprises a washer operably connected to the shaft and disposed between the rotatable member and the coil spring.

10. The flexible electrical connector of claim 1, wherein the captive fastener comprises a clip operably connected to the shaft and disposed between the rotatable member and the coil spring.

11. The flexible electrical connector of claim 10, wherein the clip comprises a retention member for retaining the electrical equipment in the captive fastener.

12. The flexible electrical connector of claim 1, wherein the electrical equipment comprises a busbar.

13. The flexible electrical connector of claim 12, wherein the busbar comprises an open-ended slot for receiving the captive fastener.

14. A flexible electrical connector for electrical equipment, the flexible electrical connector comprising:
    a flexible electrical conductor,
    a terminated end electrically and mechanically connected to the flexible electrical conductor, and
    a captive fastener for electrically and mechanically connecting the electrical equipment to the terminated end, the captive fastener operably connected to the terminated end and comprising a shaft operably connected to the terminated end, a rotatable member operably connected to the shaft, a clip operably connected to the shaft and disposed between the rotatable member and the terminated end, and a spring finger integrally formed with the clip.

15. The flexible electrical connector of claim 14, wherein the terminated end comprises a hole for receiving the shaft.

16. The flexible electrical connector of claim 15, wherein the shaft is press-fit into the hole.

17. The flexible electrical connector of claim 14, wherein the shaft comprises a threaded shaft.

18. The flexible connector of claim 17, wherein the terminated end comprises a threaded hole for receiving the threaded shaft.

19. The flexible electrical connector of claim 14, wherein the rotatable member is rotatably connected to the shaft.

20. The flexible connector of claim 14, wherein the rotatable member is integrally formed with the shaft and the shaft is rotatably connected to the terminated end.

21. The flexible electrical connector of claim 14, wherein the rotatable member comprises a nut.

22. The flexible electrical connector of claim 14, wherein the clip comprises a retention member for retaining the electrical equipment in the captive fastener.

23. The flexible electrical connector of claim 14, wherein the electrical equipment comprises a busbar.

24. The flexible electrical connector of claim 23, wherein the busbar comprises an open-ended slot for receiving the captive fastener.

* * * * *